US012015506B2

(12) United States Patent
Yao et al.

(10) Patent No.: US 12,015,506 B2
(45) Date of Patent: *Jun. 18, 2024

(54) BASE STATION SIGNALING FOR ENHANCED CHANNEL ESTIMATION FOR NEW RADIO COVERAGE

(71) Applicant: Apple Inc., Cupertino, CA (US)

(72) Inventors: Chunhai Yao, Beijing (CN); Chunxuan Ye, San Diego, CA (US); Dawei Zhang, Saratoga, CA (US); Haijing Hu, Los Gatos, CA (US); Haitong Sun, Cupertino, CA (US); Hong He, San Jose, CA (US); Hauning Niu, San Jose, CA (US); Oghenekome Oteri, San Diego, CA (US); Seyed Ali Akbar Fakoorian, San Diego, CA (US); Sigen Ye, Whitehouse Station, NJ (US); Wei Zeng, Saratoga, CA (US); Weidong Yang, San Diego, CA (US); Yushu Zhang, Beijing (CN)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/593,827

(22) PCT Filed: Sep. 24, 2020

(86) PCT No.: PCT/CN2020/117353
§ 371 (c)(1),
(2) Date: Sep. 24, 2021

(87) PCT Pub. No.: WO2022/061635
PCT Pub. Date: Mar. 31, 2022

(65) Prior Publication Data
US 2023/0216712 A1 Jul. 6, 2023

(51) Int. Cl.
*H04L 25/02* (2006.01)
*H04L 5/00* (2006.01)

(52) U.S. Cl.
CPC ........ *H04L 25/0228* (2013.01); *H04L 5/0051* (2013.01)

(58) Field of Classification Search
CPC .............. H04L 25/0228; H04L 5/0051; H04L 25/0204; H04L 25/0226; H04L 5/0053; H04L 5/0094
See application file for complete search history.

(56) References Cited

U.S. PATENT DOCUMENTS

2018/0145809 A1 5/2018 Kwak
2019/0159181 A1* 5/2019 Manolakos ........... H04W 72/23
(Continued)

FOREIGN PATENT DOCUMENTS

CN 111567002 A 8/2020

OTHER PUBLICATIONS

Huawei, et al., "Design of DL DMRS for data transmission," 3GPP TSG RAN WG1 Ad-hoc Meeting, R1-1704233, Apr. 7, 2017 (Apr. 7, 2017).
(Continued)

*Primary Examiner* — Dady Chery
(74) *Attorney, Agent, or Firm* — Blank Rome LLP

(57) ABSTRACT

Various techniques are presented to improve channel estimation in a wireless system, comprising: transmitting an indication of a physical downlink channel configuration, the physical downlink channel transmission including a demodulation reference signal (DMRS); receiving an indication that the wireless device supports bundling DMRS signals across multiple slots; transmitting, a DMRS configuration, the DMRS configuration including a channel estimation bundle window, the channel estimation bundle window
(Continued)

indicating that channel estimation may be performed across multiple slots; transmitting a set of DMRS signals in the channel estimation bundle window, wherein a first DMRS signal of the set of DMRS signals is transmitted in a first slot, and wherein a second DMRS signal of the set of DMRS signals is transmitted in a second slot, and wherein the first DMRS signal and the second DMRS signal are configured for use by the wireless device to estimate a radio channel.

20 Claims, 16 Drawing Sheets

(56) References Cited

U.S. PATENT DOCUMENTS

| | | | |
|---|---|---|---|
| 2019/0222380 A1* | 7/2019 | Manolakos | ......... H04L 25/0224 |
| 2019/0230656 A1 | 7/2019 | Soriaga | |

OTHER PUBLICATIONS

Qualcomm Inc., "Potential techniques for coverage enhancements," 3GPP TSG-RAN WG1 Meeting #101, R1-2004499, Jun. 5, 2020 (Jun. 5, 2020).

Samsung, "Continuous precoding of NR DMRS in time domain," 3GPP TSG RAN WG1 Meeting #88, R1-1702913, Feb. 17, 2017 (Feb. 17, 2017).

Samsung, "Discussion on transmission parameter sets," 3GPP TSG RAN WG1 Meeting 90bis, R1-1717601, Oct. 13, 2017 (Oct. 13, 2017).

Samsung, "Precoding granularity of NR DMRS," 3GPP TSG RAN WG1 Ad-hox Meeting, R1-1700930, Jan. 20, 2017 (Jan. 20, 2017).

Zte, et al., "On transmission setting for DL MIMO," 3GPP TSG RAN WG1 Meeting #88bis, R1-1704397, Apr. 7, 2017 (Apr. 7, 2017).

Ericsson, "Extension of PRB bundling for DL," 3GPP draft R1-1802739, vol. RAN WG1, No. Athens, Greece, Feb. 17, 2018.

* cited by examiner

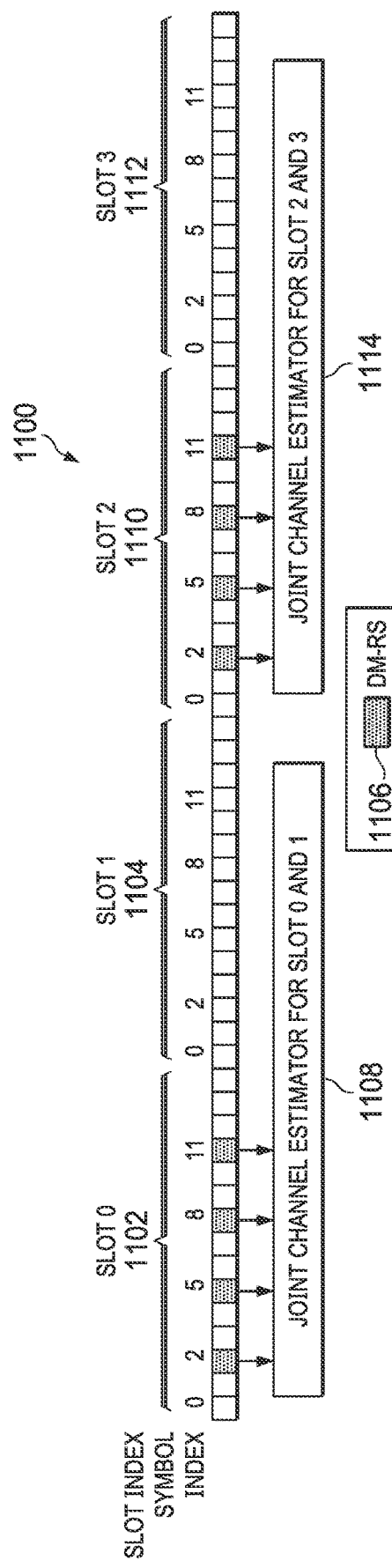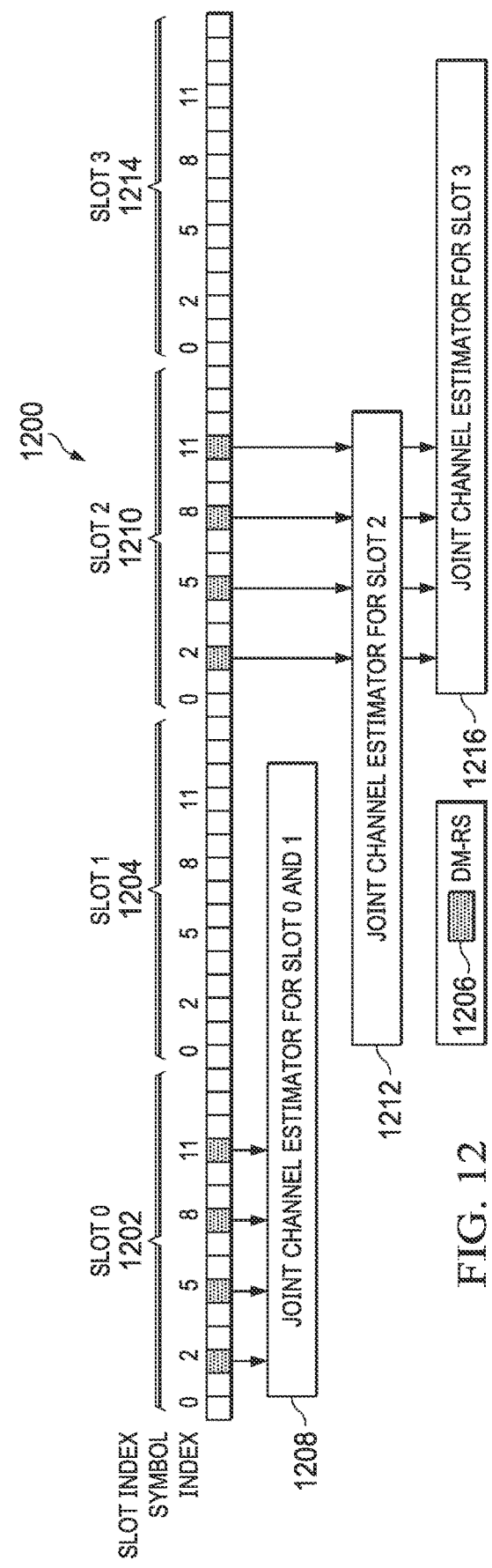

1606

TRANSMIT, TO THE WIRELESS DEVICE, A DMRS CONFIGURATION, THE DMRS CONFIGURATION INCLUDING A CHANNEL ESTIMATION WINDOW, THE CHANNEL ESTIMATION WINDOW INDICATING THAT CHANNEL ESTIMATION MAY BE PERFORMED ACROSS MULTIPLE SLOTS

1652

WHEREIN THE DMRS CONFIGURATION INCLUDES AN INDICATION THAT THE DMRS SIGNALS MAY BE ESTIMATED ACROSS DIFFERENT DMRS REPETITIONS

1654

WHEREIN THE DMRS CONFIGURATION INCLUDES AN INDICATION THAT THE DMRS SIGNALS MAY BE ESTIMATED ACROSS DIFFERENT TRANSPORT BLOCKS

1656

WHEREIN THE DMRS CONFIGURATION IS TRANSMITTED VIA ONE OF RADIO RESOURCE CONTROL SIGNALING, WITHIN A FIELD IN DOWNLINK CONTROL INFORMATION (DCI), OR WITHIN A MEDIA ACCESS CONTROL CONTROL ELEMENT (MAC CE)

1658

WHEREIN A SAME PDSCH PRECODING IS USED WITHIN THE CHANNEL ESTIMATION WINDOW

1660

WHEREIN THE PHYSICAL DOWNLINK CHANNEL COMPRISES ONE OF A PHYSICAL DOWNLINK SHARED CHANNEL OR A PHYSICAL DOWNLINK CONTROL CHANNEL

TRANSMIT, BY A WIRELESS NODE AND BASED ON THE DMRS CONFIGURATION, A SET OF DMRS SIGNALS IN THE CHANNEL ESTIMATION WINDOW

WHEREIN THE FIRST DMRS SIGNAL AND THE SECOND DMRS SIGNAL ARE TRANSMITTED AT A SAME POWER

BASE STATION SIGNALING FOR ENHANCED CHANNEL ESTIMATION FOR NEW RADIO COVERAGE

FIELD

The present application relates to wireless devices, and more particularly to apparatus, systems, and methods for estimating a radio channel for new radio (NR), in a wireless communication system.

BACKGROUND

Wireless communication systems are rapidly growing in usage. In recent years, wireless devices such as smart phones and tablet computers have become increasingly sophisticated. In addition to supporting telephone calls, many mobile devices now provide access to the internet, email, text messaging, and navigation using the global positioning system (GPS), and are capable of operating sophisticated applications that utilize these functionalities. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), HSPA, 3GPP2 CDMA2000 (e.g., 1×RTT, 1×EV-DO, HRPD, eHRPD), IEEE 802.11 (WLAN or Wi-Fi), BLUETOOTH™, etc.

The ever increasing number of features and functionality introduced in wireless communication devices also creates a continuous need for improvement in both wireless communications and in wireless communication devices. To increase coverage and better serve the increasing demand and range of envisioned uses of wireless communication, in addition to the communication standards mentioned above, there are further wireless communication technologies under development, including fifth generation (5G) new radio (NR) communication. Accordingly, improvements in the field in support of such development and design are desired.

SUMMARY

Aspects relate to apparatuses, systems, and methods for channel estimation in a wireless system. For example, a first aspect addresses a technique for channel estimation in a wireless system, including receiving, by a wireless device, an indication of a physical downlink channel configuration for receiving a physical downlink channel transmission, the physical downlink channel transmission including a demodulation reference signal (DMRS); transmitting, by the wireless device, an indication that the wireless device supports bundling DMRS signals across multiple slots; receiving, by the wireless device, a DMRS configuration, the DMRS configuration including a channel estimation bundle window, the channel estimation bundle window indicating that channel estimation may be performed across multiple slots; receiving, based on the DMRS configuration, a set of DMRS signals within the channel estimation bundle window, wherein a first DMRS signal of the set of DMRS signals is received in a first slot, and wherein a second DMRS signal of the set of DMRS signals is received in a second slot; estimating a radio channel based on the first DMRS signal and the second DMRS signal; and decoding a transmission from a wireless node based on the estimated radio channel.

Another aspect addresses a technique for channel estimation in a wireless system, comprising receiving, by a wireless device, an indication of a physical uplink channel configuration, the physical uplink channel configuration for transmitting a physical uplink channel transmission including a demodulation reference signal (DMRS); transmitting, by the wireless device, an indication that the wireless device supports bundling DMRS signals across multiple slots; receiving, by the wireless device, a DMRS configuration, the DMRS configuration including a channel estimation bundle window, the channel estimation bundle window indicating that channel estimation may be performed across multiple slots; and transmitting, based on the DMRS configuration, a set of DMRS signals to a wireless node within the channel estimation bundle window, wherein a first DMRS signal of the set of DMRS signals is transmitted in a first slot, and wherein a second DMRS signal of the set of DMRS signals is transmitted in a second slot, wherein the first DMRS signal and the second DMRS signal are configured for use by the wireless node to estimate a radio channel.

Another aspect includes a technique for channel estimation in a wireless system, comprising: transmitting, to a wireless device, an indication of a physical downlink channel configuration for receiving a physical downlink channel transmission, the physical downlink channel transmission including a demodulation reference signal (DMRS); receiving, from the wireless device, an indication that the wireless device supports bundling DMRS signals across multiple slots; transmitting, to the wireless device, a DMRS configuration, the DMRS configuration including a channel estimation bundle window, the channel estimation bundle window indicating that channel estimation may be performed across multiple slots; transmitting, by a wireless node and based on the DMRS configuration, a set of DMRS signals in the channel estimation bundle window, wherein a first DMRS signal of the set of DMRS signals is transmitted in a first slot, and wherein a second DMRS signal of the set of DMRS signals is transmitted in a second slot, and wherein the first DMRS signal and the second DMRS signal are configured for use by the wireless device to estimate a radio channel based on the first DMRS signal and the second DMRS signal.

Another aspect includes a technique for channel estimation in a wireless system, comprising: transmitting, to a wireless device, an indication of a physical uplink channel configuration for transmitting a physical uplink channel transmission including a demodulation reference signal (DMRS) schedule; receiving, from the wireless device, an indication that the wireless device supports bundling DMRS signals across multiple slots; transmitting, to the wireless device, a DMRS configuration, the DMRS configuration including a channel estimation bundle, the channel estimation bundle window indicating that channel estimation may be performed across multiple slots; receiving, by a wireless node, a set of DMRS signals based on the DMRS configuration and within the channel estimation bundle window, wherein a first DMRS signal of the set of DMRS signals is received in a first slot, and wherein a second DMRS signal of the set of DMRS signals is received in a second slot; estimating a radio channel based on the first DMRS signal and the second DMRS signal; and decoding a transmission from the wireless device based on the estimated radio channel.

The techniques described herein may be implemented in and/or used with a number of different types of devices, including but not limited to cellular phones, wireless devices, tablet computers, wearable computing devices, portable media players, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF DRAWINGS

A better understanding of the present subject matter can be obtained when the following detailed description of various aspects is considered in conjunction with the following drawings, in which:

FIGS. 10-12 are radio frame diagrams illustrating examples of dynamic DMRS configurations, in accordance with aspects of the present disclosure;

FIG. 16B is a flow diagram illustrating various ways to transmit, to the wireless device, a DMRS configuration of step 1606, in accordance with aspects of the present disclosure;

FIG. 16C is a flow diagram illustrating various ways to transmit, by a wireless node and based on the DMRS configuration, a set of DMRS signals in the channel estimation bundle window of step 1608, in accordance with aspects of the present disclosure;

Figure 1:
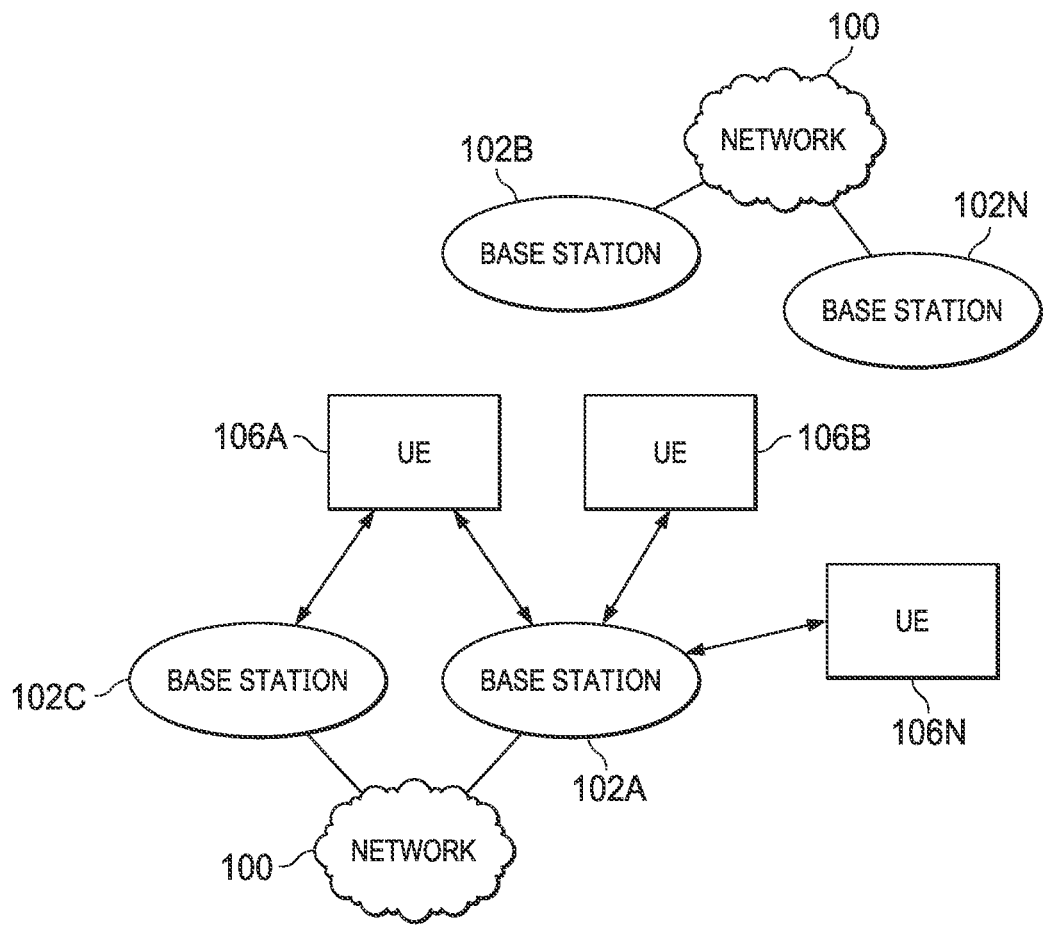
FIG. 1 illustrates an example wireless communication system, according to some aspects.

While the features described herein may be susceptible to various modifications and alternative forms, specific aspects thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Various techniques are presented herein to improve DMRS performance compared with Rel-15. In particular, techniques are disclosed for cross slot channel estimation of radio channel quality for UL and DL channels. By estimating a channel across slots, a channel may be more precisely estimated over a period of time. By allowing a channel to more precisely estimated, a DMRS density may be dynamically reduced, if appropriate, helping allow for more efficient use of available radio resources. Accordingly, techniques are disclosed for dynamic DMRS reconfiguration.

The following is a glossary of terms that may be used in this disclosure:

Memory Medium—Any of various types of non-transitory memory devices or storage devices. The term "memory medium" is intended to include an installation medium, e.g., a CD-ROM, floppy disks, or tape device, a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic."

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems or devices that are mobile or portable and that perform wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, wearable devices (e.g., smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Wireless Device—any of various types of computer systems or devices that perform wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station—The term "Base Station" or "wireless station" has the full breadth of its ordinary meaning, and at least includes a wireless communication station installed at a fixed location and used to communicate as part of a wireless telephone system or radio system.

Processing Element (or Processor)—refers to various elements or combinations of elements that are capable of performing a function in a device, such as a user equipment or a cellular network device. Processing elements may include, for example: processors and associated memory, portions or circuits of individual processor cores, entire processor cores, individual processors, processor arrays, circuits such as an ASIC (Application Specific Integrated Circuit), programmable hardware elements such as a field programmable gate array (FPGA), as well any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in some aspects, "approximately" may mean within 0.1% of some specified or desired value, while in various other aspects, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

Example Wireless Communication System

Turning now to FIG. 1, a simplified example of a wireless communication system is illustrated, according to some aspects. It is noted that the system of FIG. 1 is merely one example of a possible system, and that features of this disclosure may be implemented in any of various systems, as desired.

As shown, the example wireless communication system includes a base station 102A, which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102A may be a base transceiver station (BTS) or cell site (a "cellular base station") and may include hardware that enables wireless communication with the UEs 106A through 106N.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1×RTT, 1×EV-DO, HRPD, eHRPD), etc. Note that if the base station 102A is implemented in the context of LTE, it may alternately be referred to as an 'eNodeB' or 'eNB'. Note that if the base station 102A is implemented in the context of 5G NR, it may alternately be referred to as a 'gNodeB' or 'gNB'.

As shown, the base station 102A may also be equipped to communicate with a network 10 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells." Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

In some aspects, base station 102A may be a next generation base station, e.g., a 5G New Radio (5G NR) base station, or "gNB." In some aspects, a gNB may be connected to a legacy evolved packet core (EPC) network and/or to a NR core (NRC)/5G core (5GC) network. In addition, a gNB cell may include one or more transition and reception points (TRPs). In addition, a UE capable of operating according to 5G NR may be connected to one or more TRPs within one or more gNBs. For example, it may be possible that that the base station 102A and one or more other base stations 102 support joint transmission, such that UE 106 may be able to receive transmissions from multiple base stations (and/or multiple TRPs provided by the same base station). For example, as illustrated in FIG. 1, both base station 102A and base station 102C are shown as serving UE 106A.

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H), and/or any other wireless communication protocol, if desired. Other combinations of wireless communication standards (including more than two wireless communication standards) are also possible.

Example User Equipment (UE)

Figure 2:
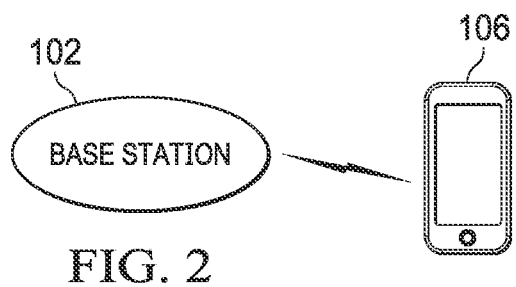
FIG. 2 illustrates a base station (BS) in communication with a user equipment (UE) device, according to some aspects.

FIG. 2 illustrates user equipment 106 (e.g., one of the devices 106A through 106N) in communication with a base station 102, according to some aspects. The UE 106 may be a device with cellular communication capability such as a mobile phone, a hand-held device, a computer, a laptop, a tablet, a smart watch or other wearable device, or virtually any type of wireless device.

The UE 106 may include a processor (processing element) that is configured to execute program instructions stored in memory. The UE 106 may perform any of the method aspects described herein by executing such stored instructions. Alternatively, or in addition, the UE 106 may include a programmable hardware element such as an FPGA (field-programmable gate array), an integrated circuit, and/ or any of various other possible hardware components that are configured to perform (e.g., individually or in combination) any of the method aspects described herein, or any portion of any of the method aspects described herein.

The UE 106 may include one or more antennas for communicating using one or more wireless communication protocols or technologies. In some aspects, the UE 106 may be configured to communicate using, for example, NR or LTE using at least some shared radio components. As additional possibilities, the UE 106 could be configured to communicate using CDMA2000 (1×RTT/1×EV-DO/HRPD/ eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some aspects, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 5G NR (or either of LTE or 1×RTT, or either of LTE or GSM, among various possibilities), and separate radios for communicating using each of Wi-Fi and Bluetooth. Other configurations are also possible.

Example Communication Device

Figure 3:
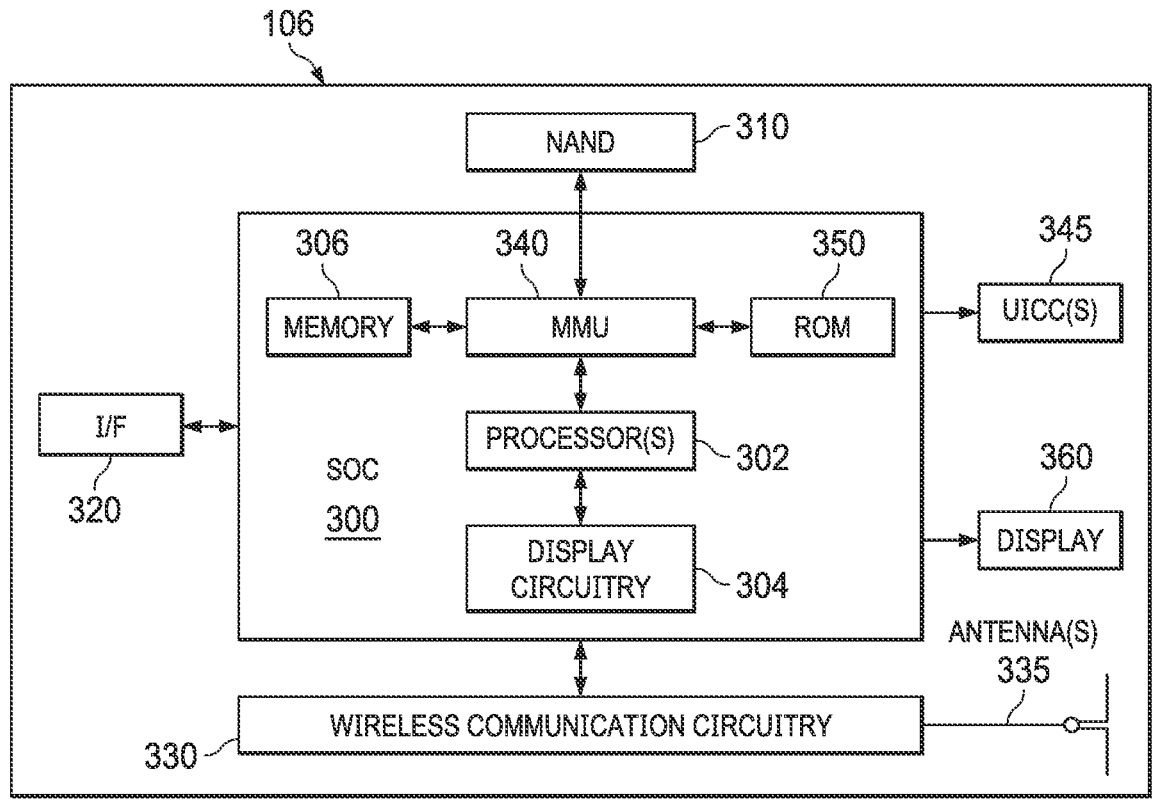
FIG. 3 illustrates an example block diagram of a UE, according to some aspects.

FIG. 3 illustrates an example simplified block diagram of a communication device 106, according to some aspects. It is noted that the block diagram of the communication device of FIG. 3 is only one example of a possible communication device. According to aspects, communication device 106 may be a user equipment (UE) device, a mobile device or mobile station, a wireless device or wireless station, a desktop computer or computing device, a mobile computing device (e.g., a laptop, notebook, or portable computing device), a tablet, and/or a combination of devices, among other devices. As shown, the communication device 106 may include a set of components 300 configured to perform core functions. For example, this set of components may be implemented as a system on chip (SOC), which may include portions for various purposes. Alternatively, this set of components 300 may be implemented as separate components or groups of components for the various purposes. The set of components 300 may be coupled (e.g., communicatively; directly or indirectly) to various other circuits of the communication device 106.

For example, the communication device 106 may include various types of memory (e.g., including NAND flash 310), an input/output interface such as connector I/F 320 (e.g., for connecting to a computer system; dock; charging station; input devices, such as a microphone, camera, keyboard; output devices, such as speakers; etc.), the display 360, which may be integrated with or external to the communication device 106, and wireless communication circuitry 330 (e.g., for LTE, LTE-A, NR. UMTS, GSM, CDMA2000, Bluetooth, Wi-Fi, NFC, GPS, etc.). In some aspects, communication device 106 may include wired communication circuitry (not shown), such as a network interface card, e.g., for Ethernet.

The wireless communication circuitry 330 may couple (e.g., communicatively; directly or indirectly) to one or more antennas, such as antenna(s) 335 as shown. The wireless communication circuitry 330 may include cellular communication circuitry and/or short to medium range wireless communication circuitry, and may include multiple receive chains and/or multiple transmit chains for receiving and/or transmitting multiple spatial streams, such as in a multiple-input multiple output (MIMO) configuration.

In some aspects, as further described below, cellular communication circuitry 330 may include one or more receive chains (including and/or coupled to (e.g., communicatively; directly or indirectly) dedicated processors and/ or radios) for multiple RATs (e.g., a first receive chain for LTE and a second receive chain for 5G NR). In addition, in some aspects, cellular communication circuitry 330 may include a single transmit chain that may be switched between radios dedicated to specific RATs. For example, a first radio may be dedicated to a first RAT, e.g., LTE, and may be in communication with a dedicated receive chain and a transmit chain shared with a second radio. The second radio may be dedicated to a second RAT, e.g., 5G NR, and may be in communication with a dedicated receive chain and the shared transmit chain. In some aspects, the second RAT may operate at mmWave frequencies. As mmWave systems operate in higher frequencies than typically found in LTE systems, signals in the mmWave frequency range are heavily attenuated by environmental factors. To help address this attenuating, mmWave systems often utilize beamforming and include more antennas as compared LTE systems. These antennas may be organized into antenna arrays or panels made up of individual antenna elements. These antenna arrays may be coupled to the radio chains.

The communication device 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 345 that include SIM (Subscriber Identity Module) functionality, such as one or more UICC(s) (Universal Integrated Circuit Card(s)) cards 345.

As shown, the SOC 300 may include processor(s) 302, which may execute program instructions for the communication device 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, wireless communication circuitry 330, connector I/F 320, and/or display 360. The MMU 340 may be configured to perform memory protection and page table translation or set up. In some aspects, the MMU 340 may be included as a portion of the processor(s) 302.

As noted above, the communication device 106 may be configured to communicate using wireless and/or wired communication circuitry. As described herein, the communication device 106 may include hardware and software components for implementing any of the various features and techniques described herein. The processor 302 of the communication device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the communication device 106, in conjunction with one or more of the other components 300, 304, 306, 310, 320, 330, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Further, as described herein, wireless communication circuitry 330 may include one or more processing elements. In other words, one or more processing elements may be included in wireless communication circuitry 330. Thus, wireless communication circuitry 330 may include one or more integrated circuits (ICs) that are configured to perform the functions of wireless communication circuitry 330. In addition, each integrated circuit may include circuitry (e.g., first circuitry, second circuitry, etc.) configured to perform the functions of wireless communication circuitry 330.

Example Base Station

Figure 4:
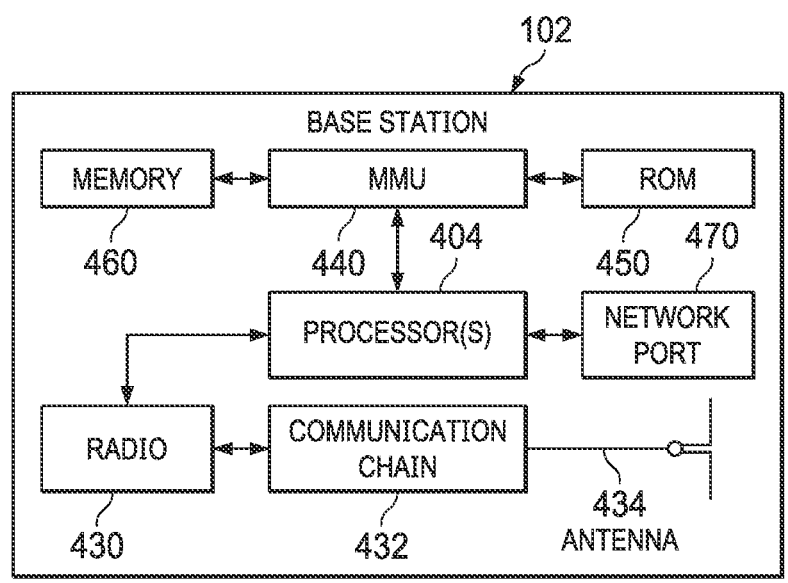
FIG. 4 illustrates an example block diagram of a BS, according to some aspects.

FIG. 4 illustrates an example block diagram of a base station 102, according to some aspects. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

In some aspects, base station 102 may be a next generation base station, e.g., a 5G New Radio (5G NR) base station, or "gNB." In such aspects, base station 102 may be connected to a legacy evolved packet core (EPC) network and/or to a NR core (NRC)/5G core (5GC) network. In addition, base station 102 may be considered a 5G NR cell and may include one or more transition and reception points (TRPs). In addition, a UE capable of operating according to 5G NR may be connected to one or more TRPs within one or more gNBs.

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless communication standards, including, but not limited to, 5G NR, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. When the base station 102 supports mmWave, the 5G NR radio may be coupled to one or more mmWave antenna arrays or panels. As another possibility, the base station 102 may include a multi-mode radio, which is capable of performing communications according to any of multiple wireless communication technologies (e.g., 5G NR and LTE, 5G NR and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

In addition, as described herein, processor(s) 404 may include one or more processing elements. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may include one or more processing elements. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Example Cellular Communication Circuitry

Figure 5:
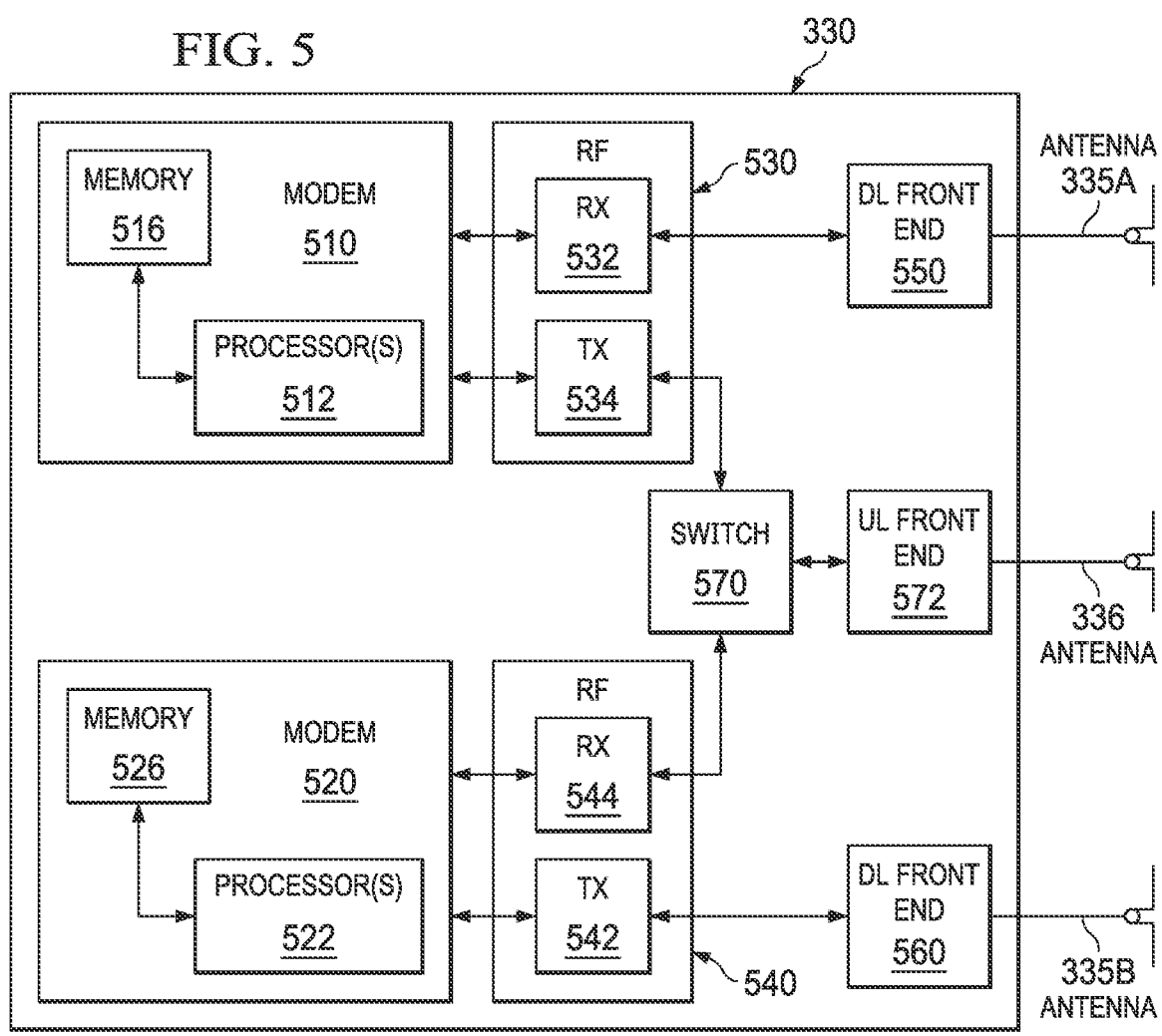
FIG. 5 illustrates an example block diagram of cellular communication circuitry, according to some aspects.

FIG. 5 illustrates an example simplified block diagram of cellular communication circuitry, according to some aspects. It is noted that the block diagram of the cellular communication circuitry of FIG. 5 is only one example of a possible cellular communication circuit; other circuits, such as circuits including or coupled to sufficient antennas for different RATs to perform uplink activities using separate antennas, or circuits including or coupled to fewer antennas, e.g., that may be shared among multiple RATs, are also possible. According to some aspects, cellular communication circuitry 330 may be included in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 330 may couple (e.g., communicatively; directly or indirectly) to one or more antennas, such as antennas 335a-b and 336 as shown. In some aspects, cellular communication circuitry 330 may include dedicated receive chains (including and/or coupled to (e.g., communicatively; directly or indirectly) dedicated processors and/or radios) for multiple RATs (e.g., a first receive chain for LTE and a second receive chain for 5G NR). For example, as shown in FIG. 5, cellular communication circuitry 330 may include a first modem 510 and a second modem 520. The first modem 510 may be configured for communications according to a first RAT, e.g., such as LTE or LTE-A, and the second modem 520 may be configured for communications according to a second RAT, e.g., such as 5G NR.

As shown, the first modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some aspects, receive circuitry 532 may be in communication with downlink (DL) front end 550, which may include circuitry for receiving radio signals via antenna 335a.

Similarly, the second modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some aspects, receive circuitry 542 may be in communication with DL front end 560, which may include circuitry for receiving radio signals via antenna 335b.

In some aspects, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 330 receives instructions to transmit according to the first RAT (e.g., as supported via the first modem 510), switch 570 may be switched to a first state that allows the first modem 510 to transmit signals according to the first RAT (e.g., via a transmit chain that includes transmit circuitry 534 and UL front end 572). Similarly, when cellular communication circuitry 330 receives instructions to transmit according to the second RAT (e.g., as supported via the second modem 520), switch 570 may be switched to a second state that allows the second modem 520 to transmit signals according to the second RAT (e.g., via a transmit chain that includes transmit circuitry 544 and UL front end 572).

As described herein, the first modem 510 and/or the second modem 520 may include hardware and software components for implementing any of the various features and techniques described herein. The processors 512, 522 may be configured to implement part or all of the features described herein, e.g., by executing program instructions stored on a memory medium (e.g., a non-transitory computer-readable memory medium). Alternatively (or in addition), processors 512, 522 may be configured as a programmable hardware element, such as an FPGA (Field Programmable Gate Array), or as an ASIC (Application Specific Integrated Circuit). Alternatively (or in addition) the processors 512, 522, in conjunction with one or more of the other components 530, 532, 534, 540, 542, 544, 550, 570, 572, 335 and 336 may be configured to implement part or all of the features described herein.

In addition, as described herein, processors 512, 522 may include one or more processing elements. Thus, processors 512, 522 may include one or more integrated circuits (ICs) that are configured to perform the functions of processors 512, 522. In addition, each integrated circuit may include circuitry (e.g., first circuitry, second circuitry, etc.) configured to perform the functions of processors 512, 522.

In some aspects, the cellular communication circuitry 330 may include only one transmit/receive chain. For example, the cellular communication circuitry 330 may not include the modem 520, the RF front end 540, the DL front end 560, and/or the antenna 335b. As another example, the cellular communication circuitry 330 may not include the modem 510, the RF front end 530, the DL front end 550, and/or the antenna 335a. In some aspects, the cellular communication circuitry 330 may also not include the switch 570, and the RF front end 530 or the RF front end 540 may be in communication, e.g., directly, with the UL front end 572.

Example Network Element

Figure 6:
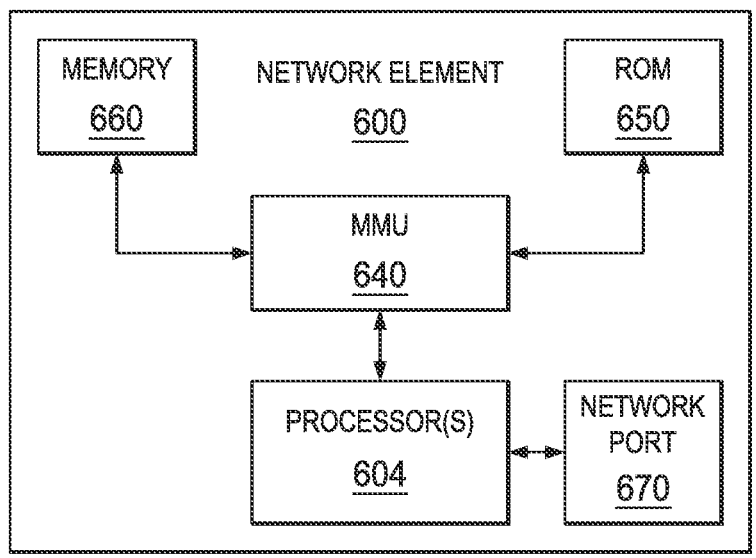
FIG. 6 illustrates an example block diagram of a network element, according to some aspects.

FIG. 6 illustrates an exemplary block diagram of a network element 600, according to some aspects. According to some aspects, the network element 600 may implement one or more logical functions/entities of a cellular core network, such as a mobility management entity (MME), serving gateway (S-GW), access and management function (AMF), session management function (SMF), network slice quota management (NSQM) function, etc. It is noted that the network element 600 of FIG. 6 is merely one example of a possible network element 600. As shown, the core network element 600 may include processor(s) 604 which may execute program instructions for the core network element 600. The processor(s) 604 may also be coupled to memory management unit (MMU) 640, which may be configured to receive addresses from the processor(s) 604 and translate those addresses to locations in memory (e.g., memory 660 and read only memory (ROM) 650) or to other circuits or devices.

The network element 600 may include at least one network port 670. The network port 670 may be configured to couple to one or more base stations and/or other cellular network entities and/or devices. The network element 600 may communicate with base stations (e.g., eNBs/gNBs) and/or other network entities/devices by means of any of various communication protocols and/or interfaces.

As described further subsequently herein, the network element 600 may include hardware and software components for implementing and/or supporting implementation of features described herein. The processor(s) 604 of the core network element 600 may be configured to implement or support implementation of part or all of the methods described herein, e.g., by executing program instructions stored on a memory medium (e.g., a nontransitory computer-readable memory medium). Alternatively, the processor 604 may be configured as a programmable hardware element, such as an FPGA (Field Programmable Gate Array), or as an ASIC (Application Specific Integrated Circuit), or a combination thereof.

New Radio (NR) Frame Structure

In NR, a radio frame has a defined length of 10 milliseconds (ms) and a subframe length of 1 ms. A numerology and frame structure may be dynamically defined based on a sub-carrier spacing (SCS) and cyclic prefix overhead. Each subframe may be divided into a number of slots. The number of slots per subframe may vary based on the SCS, typically from one slot per subframe on up to thirty two, or more, slots per subframe. Each slot may include fourteen orthogonal frequency domain modulation (OFDM) symbols. As the number of slots per subframe can vary while the length of the subframe is fixed, the length of each slot can vary based on the number of slots per subframe. In certain cases, each slot may be allocated for downlink, uplink, or mixed uplink/downlink. In certain cases, NR may also support transmissions based on mini-slots, which are portions of a slot that may be used as a minimum scheduling unit. For example, a mini-slot may include a number of symbols less than the fourteen symbols of a slot, and the exact number of symbols may be configured as needed. In certain cases, the mini-slot may include two, four, or seven symbols. In NR, a slot configuration may be configured semi-statically using radio resource control (RRC), for example for a period of time.

Demodulation Reference Signal (DMRS)

Wireless systems, such as NR systems, may include separate control and data channels. For example, NR systems may include a physical uplink control channel (PUCCH) carrying uplink control information in a control region of a transmission. The data region may be allocated to a physical uplink shared channel (PUSCH) carrying user data. In the NR system, data can be transmitted from a gNB to the UE via a physical downlink shared channel (PDSCH). A physical uplink control channel (PUCCH) can be used to acknowledge that data was received. Downlink and uplink channels or transmissions can use time-division duplexing (TDD) or frequency-division duplexing (FDD). A DMRS is generally embedded in PUCCH, PUSCH, and PDSCH transmissions. The DMRS provides a phase reference used for demodulating data for these channels and for channel estimation and is therefore specific to each UE. In certain cases, DMRS design may be specific to each channel and may be configurable as needed. For example, a gNB may transmit via RRC, scheduling and configuration information for, among other channels, PUCCH, PUSCH, and PDSCH. This scheduling information is semi-static and may define how and when to transmit or receive the PUCCH, PUSCH, and PDSCH for a period of time.

NR Slot Channel Estimation Example

Figure 7:
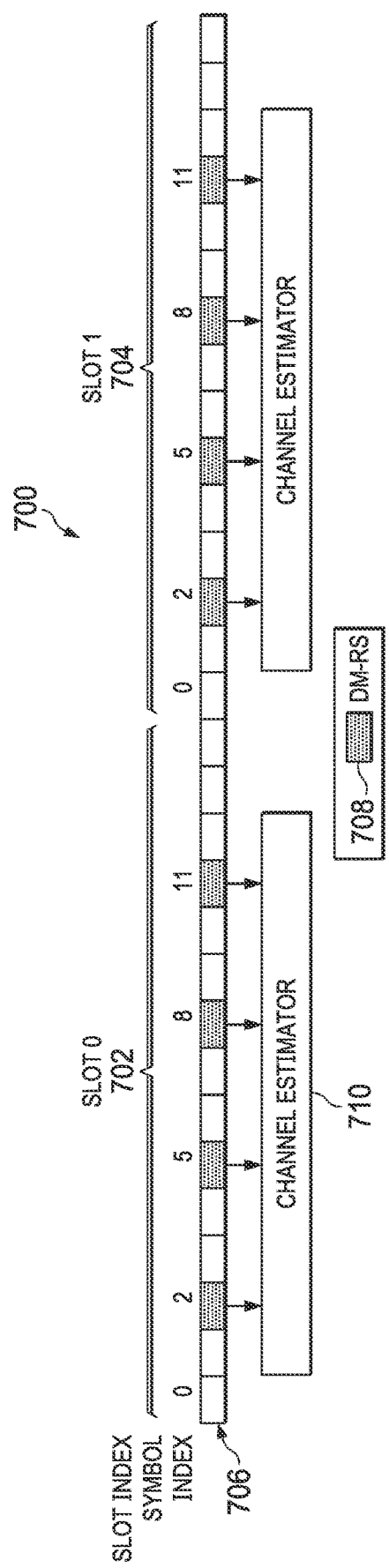
FIG. 7 is a radio frame diagram illustrating an example of channel estimation for a slot using DMRS, in accordance with aspects of the present disclosure.

Turning now to FIG. 7, a radio frame diagram is shown, illustrating an example of channel estimation 700 for a slot using DMRS, in accordance with aspects of the present disclosure. For clarity, the example of channel estimation 700 shows one subframe with two slots, i.e., slot 0 702, and slot 1 704, the frequency resource could be several PRBs according to gNB scheduling. Each slot includes fourteen OFDM symbols 706. The gNB may configure the UE to transmit a DMRS 708 along with a PUSCH transmission based on a PUSCH schedule. The PUSCH schedule may include a repetition indication indicating to the UE a number of times a PUSCH and DMRS should be repeated. In this example, the UE is configured to repeat the PUSCH over two slots and transmit the PUSCH with an associated a DMRS four times for each slot, thus the DMRS is transmitted in symbols 2, 5, 8, and 11 for each slot. The configuration may also include the specific DMRS symbols to transmit. Channel estimation 710 may be performed by the gNB based on the repeated DMRS transmissions associated with the PUSCH transmission from the UE. For example, channel estimation 710 may be performed by extracting the pilot symbols of the DMRS transmissions in symbols 2, 5, 8, and 11 for slot 0 702, estimating the channel for the extracted pilot symbols, and averaging and/or interpolating the estimates to generate an estimate for the channel across symbols of slot 0 702.

As DMRS signaling is included with PUCCH, PUSCH, and PDSCH, an amount of DMRS signaling is also semi-statically configured with the respective channel. While semi-statically configured, DMRS does not change, while the channel itself may change, for example, due to changing environmental conditions, motion of the UE, etc. As channel estimation accuracy based on the DMRS is generally dependent on how close the DMRS is to the channel in time, frequency, and signal-to-noise ratio (SNR) measurements, the semi-statically defined DMRS may have a lower spectral efficiency as the DMRS is unable to be adjusted to take into account rapidly changing (or suddenly static) channel conditions. Additionally, channel estimation based on the DMRS is performed on a per slot basis, limiting the amount of DMRS coverage available for data channel transmissions.

Cross Slot Channel Estimation

To help improve coverage of the channel and more efficiently use available bandwidth, channel estimation of the DMRS may be performed across slots. For example, by combining the DMRS over multiple slots, a more accurate channel estimation may be determined. By enabling a more accurate channel estimation, the overall DMRS overhead may be reduced or optimized while maintaining or improving channel reliability. As discussed herein, a DMRS may be discussed in conjunction with a specific physical channel (e.g., PUCCH, PUSCH, PDSCH, etc.), but it should be understood that the DMRS techniques discussed herein may be applied to any channel which may benefit from a DMRS signal.

In accordance with aspects of the present disclosure, a channel (e.g., PUCCH, PUSCH, PUDSCH, etc.) may be configured. For example, the gNB may transmit, e.g., via RRC, a channel control message including, among other configuration information, scheduling and repetition information of the control message and DMRS configuration information, such as a number of DMRS symbols to be included in the channel, to a UE. The UE may also transmit, for example via RRC, UE capability information indicating that the UE supports enhanced channel estimation. This indication that the UE supports enhanced channel estimation may be sent as a part of a UE capability report, for example in response to a UE capability inquiry from a gNB. The indication that the UE supports enhanced channel estimation may indicate that the UE supports cross slot channel estimation, dynamic DMRS configurations, both, or may be combined with any number of other capability signaling. In certain cases, the UE capability report may be transmitted in response to the channel control message, or as a part of a capability exchange between the UE and wireless network, for example, when the UE initially connects to the wireless network. In certain cases, the gNB may receive UE capability information from a source other than the UE, such as from the wireless network. If the gNB has an indication that UE supports cross slot channel estimation, the gNB may configure the UE for cross slot channel estimation. For example, the gNB may transmit DMRS configuration information to the UE indicating a channel estimation bundle window. In certain cases, the DMRS configuration information may be transmitted to the UE via RRC signaling. In certain cases, DMRS configuration information may be sent to the UE using a new field added in the downlink control information (DCI), or via a medium access control (MAC) control element (MAC-CE). For example, one bit may be added to the DCI or MAC CE that indicates whether cross slot channel estimation is enabled or disabled. In such a case, the number of slots over which the channel estimation may be performed may be predetermined. As another example, two bits may be added to the DCI or MAC CE indicating whether cross slot channel estimation is enabled and if so, a number of slots over which the channel estimation may be performed.

This channel estimation bundle window may indicate a time over which channel estimation may be performed based on DMRS signals. In certain cases, the channel estimation bundle window may be provided as a period of time, a number of slots/mini slots, a number of symbols, etc. The channel estimation bundle window may span two or more slots.

In certain cases, if the channel is an UL channel, such as PUSCH, PUCCH, etc., the channel estimation bundle window may be used by the UE to determine a period of time (e.g., time needed to transmit across the multiple slots) over which the UE should maintain a phase continuity for the DMRS transmissions for joint processing of the DMRS transmissions by the gNB. The UE may transmit the DMRS, along with the associated UL channel, during the period of time for the channel estimation bundle window based on the channel configuration, number of repetitions, DMRS configuration, etc.

In certain cases, if the channel is a DL channel, such as PDSCH, PDCCH, etc., the channel estimation bundle window may be used by the UE to determine a period of time over which the UE should apply joint DMRS processing across different DMRS repetitions (and/or transport blocks) for channel estimation. The gNB may then transmit using the same precoding for the DL channel and associated DMRS for the initial transmission and repetitions across the multiple slots in the channel estimation bundle window.

After the initial and repeated DMRS signals are received by either the UE or gNB, channel estimation may then be performed across the one or more slots. Channel estimation across multiple slots may be performed in a way similar to channel estimation within a single slot. For example, the channel estimation may be based on a least squares estimate, averaging, interpolating the estimates, or any other channel estimation technique.

In certain cases, a transmission power of the DMRS transmission by the UE on the UL and the gNB on the DL may be held constant across the initial DMRS transmission and repetitions in the channel estimation bundle window. In certain cases, if a transmit power control (TPC) command is received by the UE during the channel estimation bundle window, the UE may ignore the TPC command for the duration of the channel estimation bundle window. In certain cases, after the channel estimation bundle window ends, the UE may apply the TPC command or continue to ignore the TPC command. In certain cases where mini-slots are used, a channel estimation bundle may be configured to span two or more as mini-slots and channel estimation may be performed over the two or more mini-slots in a manner similar to that described for channel estimation across two or more slots.

Figure 8:
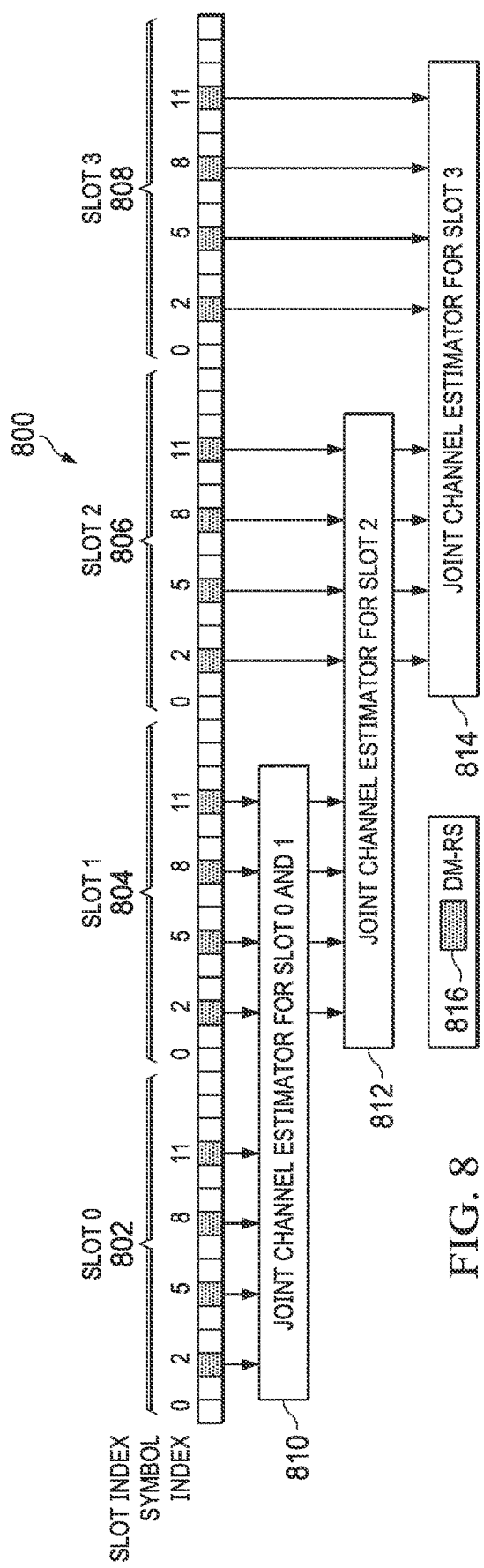
FIG. 8 is a radio frame diagram illustrating an example of cross slot channel estimation, in accordance with aspects of the present disclosure, in accordance with aspects of the present disclosure.

FIG. 8 is a radio frame diagram illustrating an example of cross slot channel estimation 800, in accordance with aspects of the present disclosure. In this example, the UE may be configured, by the gNB, on the UL to transmit the PUSCH with repetition such that the same time domain and frequency domain resources are allocated for multiple, here four, consecutive slots, slots 802, 804, 806, and 808. The gNB may also configure the DMRS 816 for the UE, for example, such that dmrs-AdditionalPosition=3, for a single symbol DMRS 816, so the UE transmits the DRMS 816 in symbols 2, 5, 8, and 11 for each slot. The gNB may also indicate to the UE that the channel estimation bundle window is two slots long. Thus, the UE may then transmit the DMRS 816 for slot 0 802 and slot 1 804 in symbols 2, 5, 8, and 11 for each slot with the same phase continuity so the gNB may perform joint channel estimation 810 across slot 0 802 and slot 1 804 for the UE.

In certain cases, the channel estimation bundle window may be a sliding channel estimation bundle window. The sliding channel estimation bundle window can be thought of as a taking the channel estimation bundle window and sliding the channel estimation bundle window along the slots 802, 804, 806, and 808 of the PUSCH repetition. Thus, in this example, slot 0 802 and slot 1 804 may be bundled and a joint channel estimation 810 performed over slot 0 802 and slot 1 804. The channel estimation bundle window may then slide over to include slot 1 804 and slot 2 806 and joint channel estimation 812 performed over slot 1 804 and slot 2 806. Then the channel estimation bundle window may then slide over to include slot 2 806 and slot 3 808 and joint channel estimation 814 performed over slot 2 806 and slot 3 808. For the sliding channel estimation bundle window, phase continuity may be maintained over the entire repeated PUSCH transmissions (e.g., four consecutive slots 802, 804, 806, and 808). Similarly, the transmission power may be held constant over the repeated PUSCH transmissions. In certain cases, a timing advance of the transmission may also be held constant over the repeated PUSCH transmissions. It may be understood that while an UL channel is addressed in this example, the techniques addressed here may be applied in a similar manner with respect to DL channels.

Figure 9:
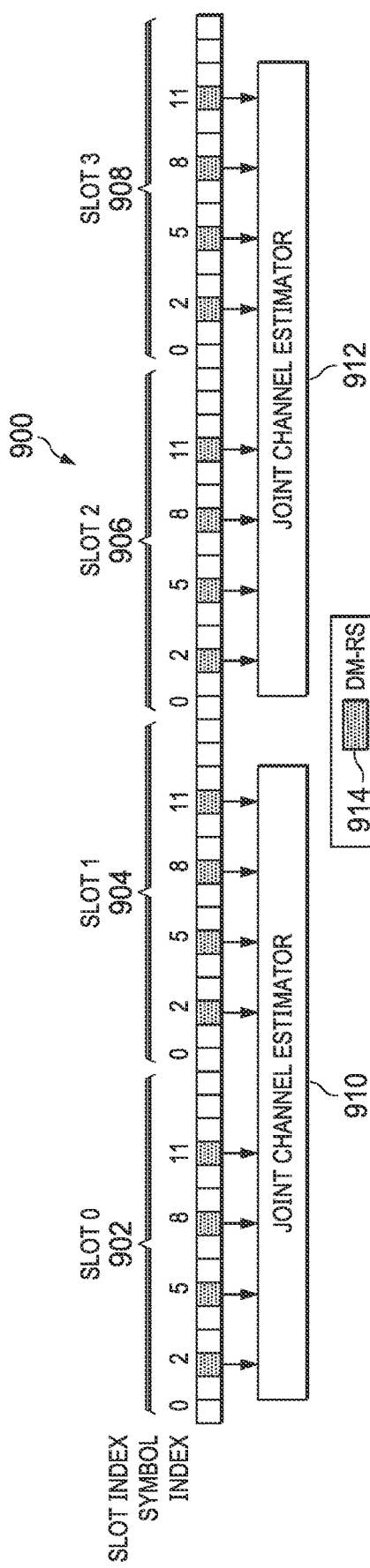
FIG. 9 is a radio frame diagram illustrating an example of cross slot channel estimation with a fixed channel estimation bundle window, in accordance with aspects of the present disclosure.

FIG. 9 is a radio frame diagram illustrating an example of cross slot channel estimation 900 with a fixed channel estimation bundle window, in accordance with aspects of the present disclosure. In certain cases, the channel estimation bundle window may be a fixed channel estimation bundle window. With a fixed channel estimation bundle window, the channel estimation bundle window may be defined over a set number of slots, one after another. In this example, the UE may be configured, by the gNB, on the UL to transmit the PUSCH with repetition such that the same time domain and frequency domain resources are allocated for multiple, here four, consecutive slots, slots 902, 904, 906, and 908. This example illustrates a channel estimation bundle window defined across two slots, with slot 0 902 and slot 1 904 in a first channel estimation bundle window and slot 2 906 and slot 3 908 in a second channel estimation bundle window. Joint channel estimation 910 may be performed based DMRS 914 transmissions in slot 0 902 and slot 1 904 and joint channel estimation 912 may be performed based on DMRS 914 transmissions in slot 2 906 and slot 3 908. In certain cases, the phase continuity of the transmission is maintained within the channel estimation bundle window. Thus, the first channel estimation bundle window may be associated with a different phase continuity than the second channel estimation bundle window. Similarly, transmission power may be maintained within a given channel estimation bundle window. In certain cases, if a TPC command is received within a channel estimation bundle window, the TPC command may be ignored for the ongoing channel estimation bundle window and then applied to the next channel estimation bundle window. Similarly, timing advance may also be maintained within a given channel estimation bundle window. In certain cases, if a timing advance command is received within a channel estimation bundle window, the timing advance command may be ignored for the ongoing channel estimation bundle window and then applied to the next channel estimation bundle window. It may be understood that while an UL channel is addressed in this example, the techniques addressed here may be applied in a similar manner with respect to DL channels.

Dynamic DMRS Configuration

To help improve DMRS efficiency, a number of DMRS transmissions for a channel may be dynamically configured. In certain cases, a UE may be configured by the gNB to frequently transmit DMRS. For example, if the UE is relatively far from the gNB, is moving rapidly, or if the channel quality as between the UE and gNB is changing often the UE may be referred to being at or near the coverage limit and the gNB may configure the UE to more frequently transmit DMRS. However, the DMRS configuration over RRC is semi-static and there may be a significant delay between opportunities to reconfigure the DMRS using RRC. Additionally, as cross slot channel estimation helps allow a channel to be estimated across slots, a number of DMRS for each slot may be reduced. For example, a UE may be configured by the gNB to transmit a DMRS four times in a slot with a channel estimation bundle window two slots long. Such a configuration can estimate a channel based on eight DMRS samples. In certain cases, if the received channel quality is high, the gNB may determine that a channel estimate may be adequately determined based on fewer DMRS samples for the channel estimation bundle window. For example, if the UE may be relatively far from the gNB, but stationary with relatively little interference, the channel may be relatively stable. In certain cases, the gNB may signal the UE to reduce the DMRS symbol number and allow the UE to transmit fewer DMRS samples. The gNB may signal the UE using a new field added in the DCI, or via a MAC-CE. For example, one bit may be added to the DCI or MAC CE that indicates whether to reduce DMRS signaling. As another example, where multiple bits are available, a number of DMRS symbols to be reduced, or specific symbols may be indicated. In such a case, the UE may halve the number of DMRS transmitted, for example, from four DMRS symbols per slot to two symbols, or otherwise reduce the number of DMRS symbols (e.g., reducing the DRMS density) by a defined amount. The symbols no longer being used for DMRS may be used for PUSCH/PUCCH/PDSCH signaling.

In certain cases, a phase tracking reference signal (PTRS) may be dynamically adjusted based on the DMRS density. For example, the PTRS density (e.g., a number of resource elements on which a PTRS signal is transmitted) may be associated with an indicated DMRS density, such that an indication to reduce the number of DMRS symbols may result in a reduced PTRS density, and vice versa. In certain cases, a DMRS port may be changed per channel estimation bundle window to help allow for greater frequency diversity. In certain cases, this DMRS port hopping may be used with fixed or non-overlapping channel estimation bundle windows. In certain cases, a new bit may be added in a DL DCI to indicate the PTRS density.

Figure 10:
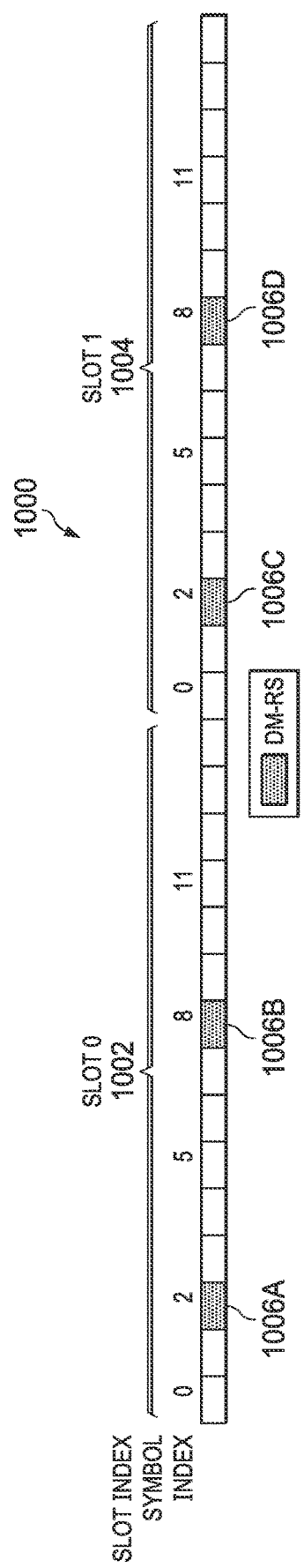

FIG. 10 is a radio frame diagram illustrating an example of dynamic DMRS configuration 1000, in accordance with aspects of the present disclosure. In this example, a UE may be initially configured via an RRC message by the gNB to transmit DMRS signals four times in a slot with a channel estimation bundle window two slots long, here slot 0 1002 and slot 1 1004. The gNB may then determine that the DMRS for the UE has been over-configured and may be reduced. The gNB may then signal the UE, for example via DCI or MAC-CE to reduce the amount of DMRS signaling. In certain cases, the DMRS density may be reduced for each slot of the bundle window. In this example, the UE may have originally been configured to transmit the DMRS in symbols 2, 5, 8, and 11 of each slot and after the DMRS is reduced, the UE may transmit the DMRS in symbol 2 1006A and symbol 8 1006B of slot 0 1002 and symbol 2 1006C and symbol 8 1006D of slot 1 1004. The gNB may then perform joint channel estimation for slot 0 1002 and slot 1 1004 based on the received DMRS.

FIG. 11 is a radio frame diagram illustrating an example of dynamic DMRS configuration 1100, in accordance with aspects of the present disclosure. In certain cases, the DMRS density may be reduced by transmitting the DMRS signals in specific slots of the channel estimation bundle window. In this example, a UE may be initially configured via an RRC message by the gNB to transmit DMRS signals four times in a slot with a channel estimation bundle window two slots long with a fixed channel estimation bundle window. Here, slot 0 1102 and slot 1 1104 may be included within a first channel estimation bundle window and slot 2 1110 and slot 3 1112 may be included within a second channel estimation bundle window. The UE may then receive an indication from the gNB to reduce the DMRS density, such as via DCI or MAC-CE signaling. In this example, the DMRS density may be reduce by half. When the DMRS density is reduced, the DMRS may be front loaded and transmitted in the front slot or slots (e.g., a channel estimation bundle window of three slots may, when the DMRS density is reduced, have DMRS signaling in the front two slots) of the channel estimation bundle window. The DMRS signaling in the later slots (e.g., later in time) may be removed. In this example, DMRS 1106 signaling occurs in slot 0 1102 of the first channel estimation bundle window slot 2 1110 of the second channel estimation bundle window. No DMRS 1106 signaling occurs in slot 1 1104 of the first channel estimation bundle window slot 2 1112 of the second channel estimation bundle window. The gNB may still perform joint channel estimation 1108 for the first channel estimation bundle window across slot 0 1102 and slot 1 1104 and the first channel estimation bundle window 1114 across slot 2 1110 and slot 3 1112. In certain cases, the DMRS may be transmitted in the front slots to help allow channel estimation to be performed earlier in time and avoid possible channel decoding delays.

In certain cases, when DMRS density is reduced, the DMRS may be transmitted in certain slots based on a pattern. For example, the DMRS may be transmitted in one slot every two slots such that DMRS may be transmitted in the first, third, and fifth slots, while the DMRS may be omitted in the second, fourth, and sixth slots. This pattern may be per channel estimation bundle window.

FIG. 12 is a radio frame diagram illustrating an example of dynamic DMRS configuration 1200, in accordance with aspects of the present disclosure. In this example, a UE may be initially configured via an RRC message by the gNB to transmit DMRS signals four times in a slot with a channel estimation bundle window two slots long with a sliding channel estimation bundle window. Here, slot 0 1202 and slot 1 1204 may be included within a first channel estimation bundle window, slot 1 1204 and slot 2 1210 may be included within a second channel estimation bundle window, and slot 2 1210 and slot 3 1214 may be included within a third channel estimation bundle window. The UE may then receive an indication from the gNB to reduce the DMRS density, such as via DCI or MAC CE signaling. In this example, the DMRS density may be reduce by half. When the DMRS density is reduced, the DMRS may be reduced based on a pattern. In this example, the DMRS is transmitted every other slot, thus DMRS is transmitted in slot 0 1202 and slot 2 1210 and omitted from slot 1 1204 and slot 3 1214. A joint channel estimation 1208 may be performed for the first channel estimation bundle window across slot 0 1202 and slot 1 1204 based on the DMRS transmitted in slot 0 1202. Another joint channel estimation 1212 may be performed for the second channel estimation bundle window across slot 1 1204 and slot 2 1210 based on the DMRS transmitted in slot 2 1210. Another joint channel estimation 1216 may be performed for the third channel estimation bundle window across slot 2 1210 and slot 3 1214 also based on the DMRS transmitted in slot 2 1210.

In certain cases, when the DMRS is front loaded and/or transmitted based on a pattern, the transmission power and phase may be maintained across the channel estimation bundle window. In certain cases, a sounding reference signal (SRS) may be omitted from the first slot and/or the slots used for transmitting the DMRS. It may be understood that while an UL channel is addressed in this example, the techniques addressed here may be applied in a similar manner with respect to DL channels.

Figure 13:
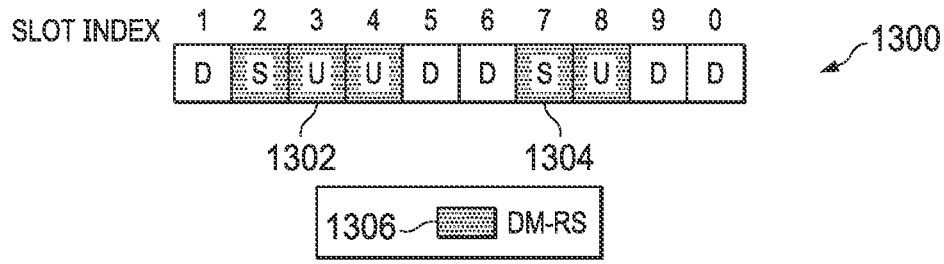
FIG. 13 is a radio frame diagram illustrating an example of cross slot channel estimation for NR TDD, in accordance with aspects of the present disclosure.

FIG. 13 is a radio frame diagram illustrating an example of cross slot channel estimation for NR TDD 1300, in accordance with aspects of the present disclosure. To help maintain phase continuity, the gNB and/or network may indicate, for example via DIC or MAC CE signaling, that a cross slot channel estimation bundle window are continuous UL slots in the UL-DL configuration. In this example, two UL-DL configurations are configured. DSUUD in slots 1-5 and DSUDD in slots 6-0, where D represents a DL slot, S represents a special slot which includes DL symbols, and U represents an UL slot. In such a UL-DL configuration, slots 2-4 and 7-8 are continuous UL slots and a DMRS 1306 may be transmitted in one or more of the continuous UL slots, as described above. Thus, cross slot channel estimation 1302 and 1304 may be performed in a manner similar to that described above for slots 2-4 and slots 7-8, respectively. It may be understood that while an UL channel is addressed in this example, the techniques addressed here may be applied in a similar manner with respect to DL channels (e.g., cross slot channel estimation bundle window may be defined for continuous DL slots in the UL-DL configuration).

Figure 14A:
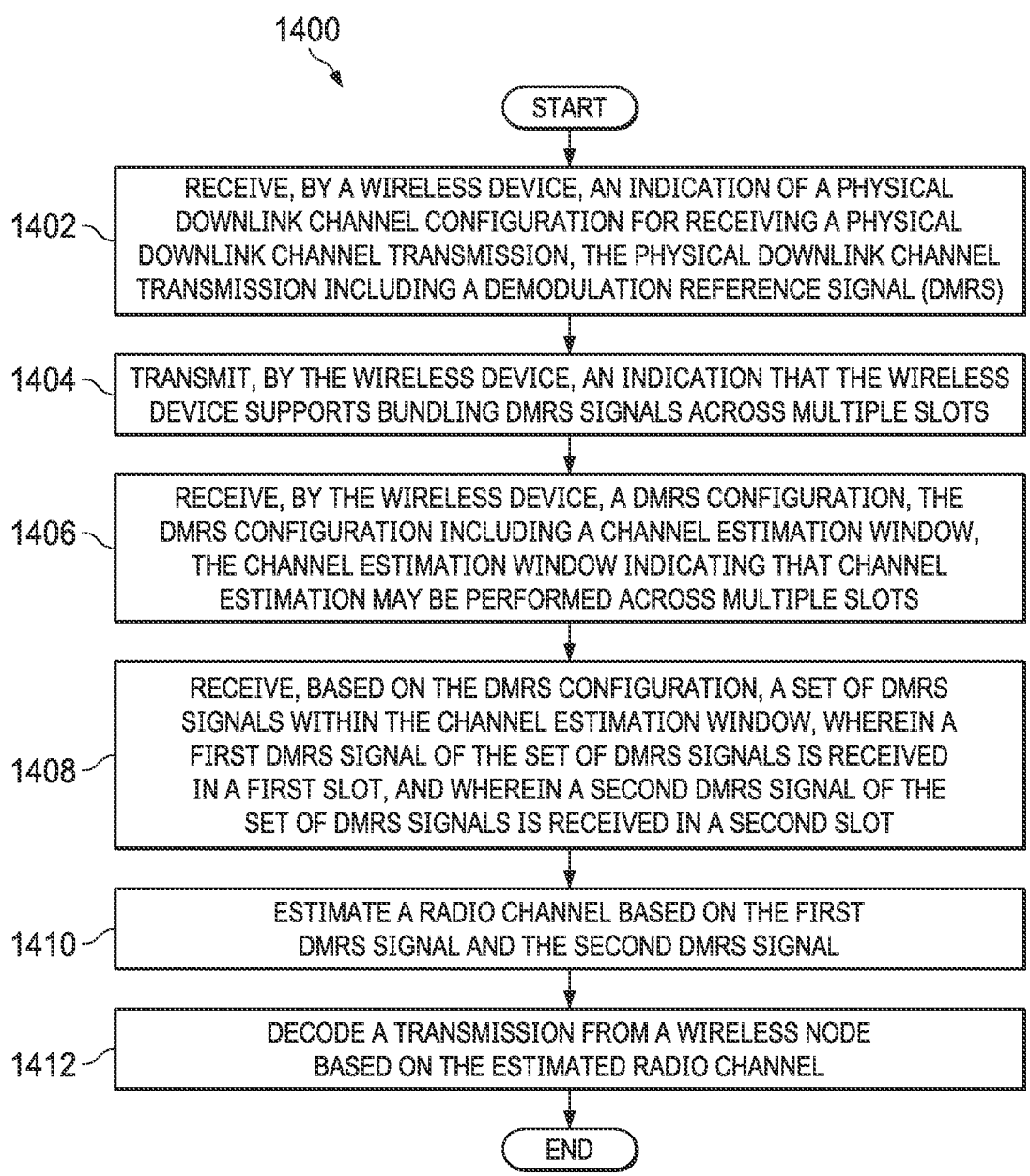
FIG. 14A is a flow diagram illustrating a technique for channel estimation in a wireless system, in accordance with aspects of the present disclosure.

FIG. 14A is a flow diagram illustrating a technique for channel estimation in a wireless system 1400, in accordance with aspects of the present disclosure. At block 1402, a wireless device receives an indication of a physical downlink channel configuration for receiving a physical downlink channel transmission, the physical downlink channel transmission including a demodulation reference signal (DMRS). For example, a UE may receive a DL channel configuration message via RRC configuring the UE to receive a DL channel, and DMRS transmitted with the DL channel, from the gNB. At block, 1404, the wireless device transmits an indication that the wireless device supports bundling DMRS signals across multiple slots. For example, the UE may indicate support for cross slot channel estimation and/or dynamic DMRS configuration via a UE capability message. At block 1406, the wireless device receives a DMRS configuration, the DMRS configuration including a channel estimation bundle window, the channel estimation bundle window indicating that channel estimation may be performed across multiple slots. For example, the wireless device may receive a DMRS configuration via a DCI or MAC CE message. At block 1408, a set of DMRS signals within the channel estimation bundle window may be received based on the DMRS configuration, wherein a first DMRS signal of the set of DMRS signals is received in a first slot, and wherein a second DMRS signal of the set of DMRS signals is received in a second slot. At block 1410, a radio channel may be estimated based on the first DMRS signal and the second DMRS signal. For example, the UE may estimate a DL radio channel across multiple slots. At block 1412, a transmission from a wireless node may be decoded based on the estimated radio channel. For example, the DMRS may be used to estimate a radio channel and used to decode a transmission received from the gNB over the radio channel.

Figure 14B:
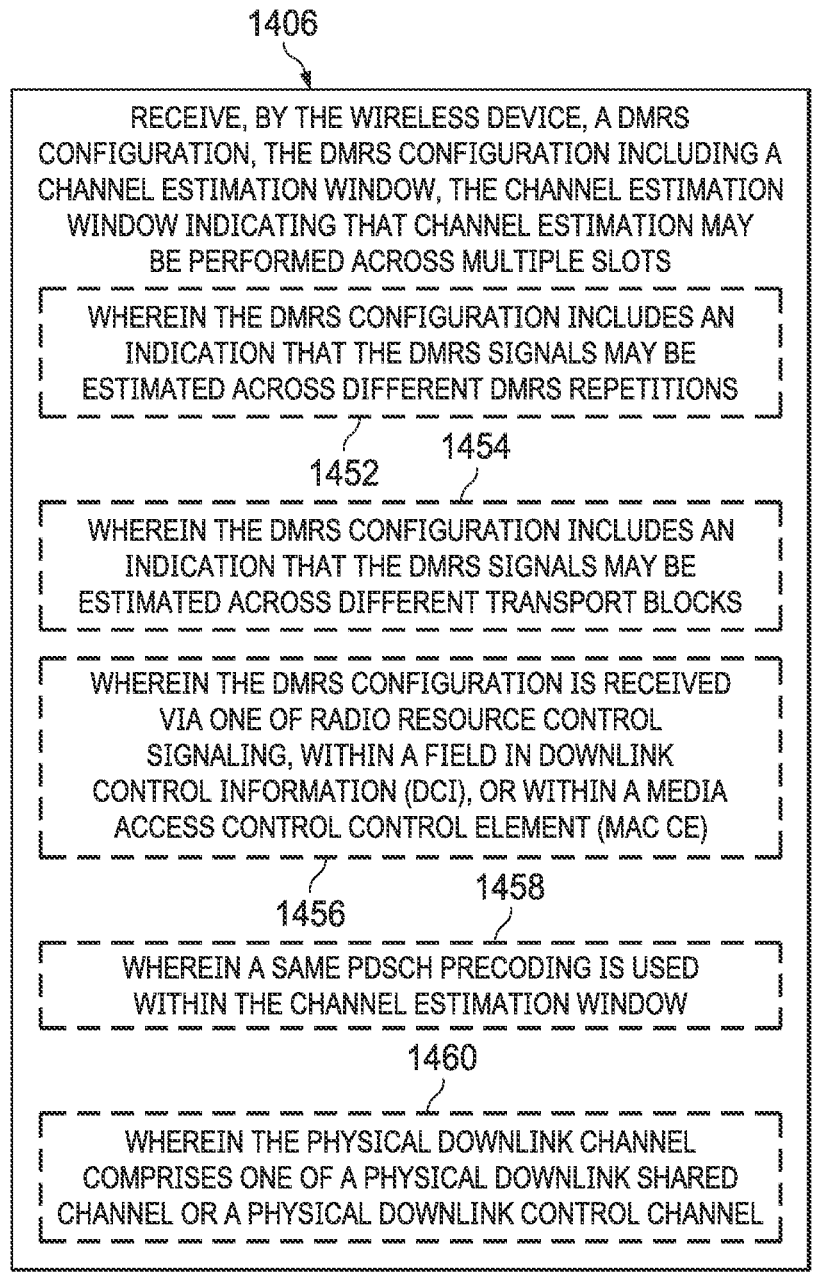
FIG. 14B is a flow diagram illustrating various ways to receive the indication of a physical downlink channel configuration of step, in accordance with aspects of the present disclosure.

FIG. 14B is a flow diagram illustrating various ways to receive the indication of a physical downlink channel configuration of step 1406, in accordance with aspects of the present disclosure. At block 1452, an option is presented for where the DMRS configuration includes an indication that the DMRS signals may be estimated across different DMRS repetitions. At block 1454, an option is presented for where the DMRS configuration includes an indication that the DMRS signals may be estimated across different transport blocks. At block 1456, an option is presented for where the DMRS configuration is received via one of radio resource control signaling, within a field in DCI, or within a MAC CE. At block 1458, an option is presented for where a same PDSCH precoding is used within the channel estimation bundle window. At block 1460, an option is presented for where the physical downlink channel comprises one of a physical downlink shared channel or a physical downlink control channel.

Figure 15A:
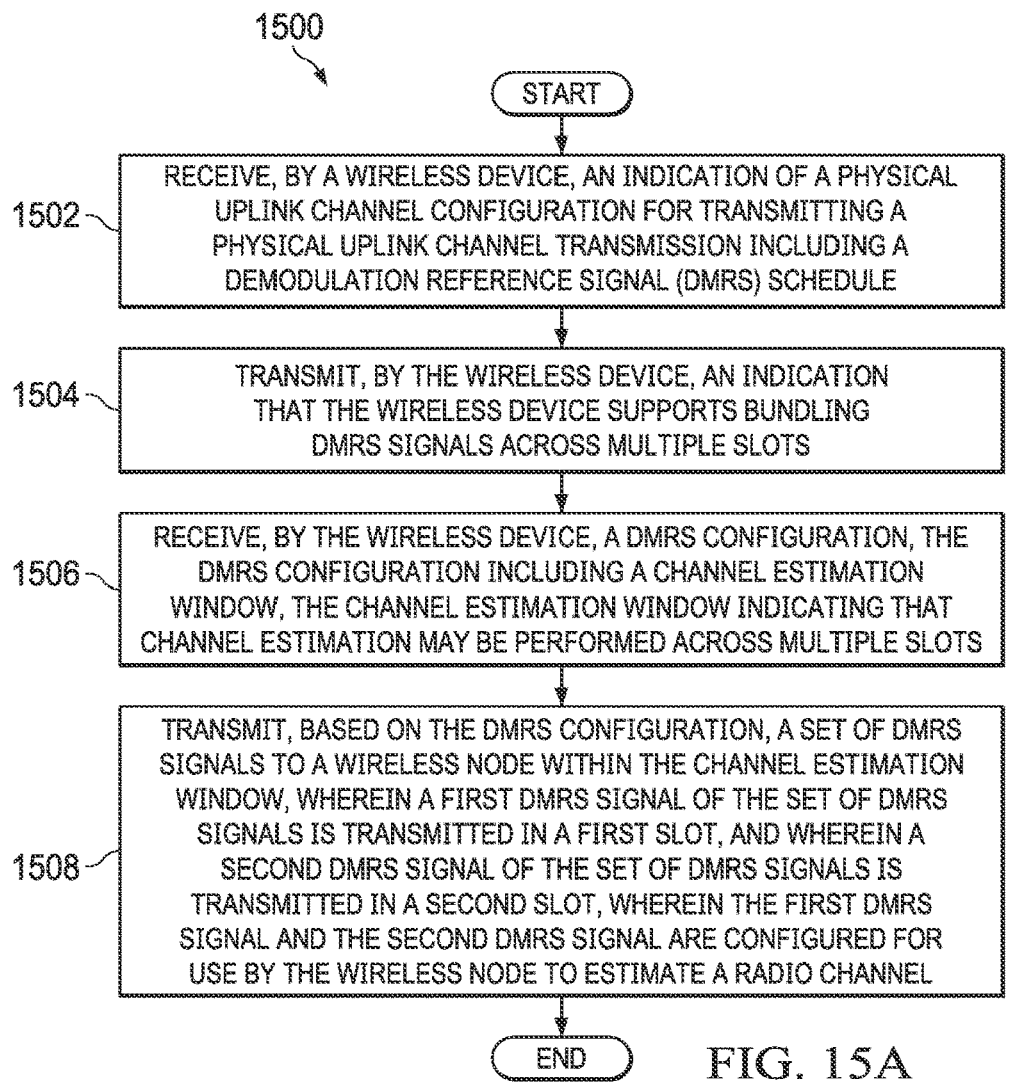
FIG. 15A is a flow diagram illustrating a technique for channel estimation in a wireless system, in accordance with aspects of the present disclosure.

FIG. 15A is a flow diagram illustrating a technique for channel estimation in a wireless system 1500, in accordance with aspects of the present disclosure. At block 1502, a wireless device receives an indication of a physical uplink channel configuration, the physical uplink channel configuration for transmitting a physical uplink channel transmission including indicating a demodulation reference signal (DMRS) schedule. For example, a UE may receive a UL channel configuration message via RRC configuring the UE to transmit a UL channel and DMRS associated with the UL channel. At block 1504, the wireless device transmits an indication that the wireless device supports bundling DMRS signals across multiple slots. For example, the UE may indicate support for cross slot channel estimation and/or dynamic DMRS configuration via a UE capability message. At block 1506, the wireless device receives a DMRS configuration, the DMRS configuration including a channel estimation bundle window, the channel estimation bundle window indicating that channel estimation may be performed across multiple slots. At block 1508, a set of DMRS signals to a wireless node within the channel estimation bundle window are transmitted based on the DMRS configuration, wherein a first DMRS signal of the set of DMRS signals is transmitted in a first slot, and wherein a second DMRS signal of the set of DMRS signals is transmitted in a second slot, and wherein the first DMRS signal and the second DMRS signal are configured for use by the wireless node to estimate a radio channel. For example, the wireless device may receive a DMRS configuration via a DCI or MAC CE message and the UE may transmit a DMRS signal in multiple slots based on the DMRS configuration and configured for the gNB to estimate a radio channel across the multiple slots.

Figure 15B:
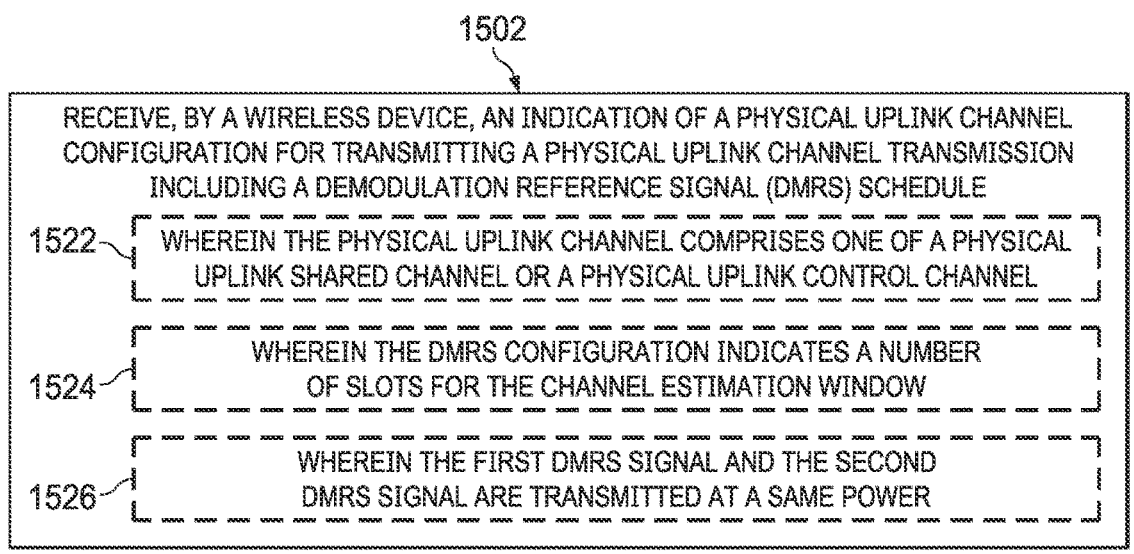
FIG. 15B is a flow diagram illustrating various ways to receive the DMRS configuration of step 1506, in accordance with aspects of the present disclosure.

FIG. 15B is a flow diagram illustrating various ways to receive the DMRS configuration of step 1506, in accordance with aspects of the present disclosure. At block 1522, an option is presented for where the physical uplink channel comprises one of a physical uplink shared channel or a physical uplink control channel. At block 1524, an option is presented for where the DMRS configuration indicates a number of slots for the channel estimation bundle window. At block 1526, an option is presented for where the first DMRS signal and the second DMRS signal are transmitted at a same power.

Figure 15C:
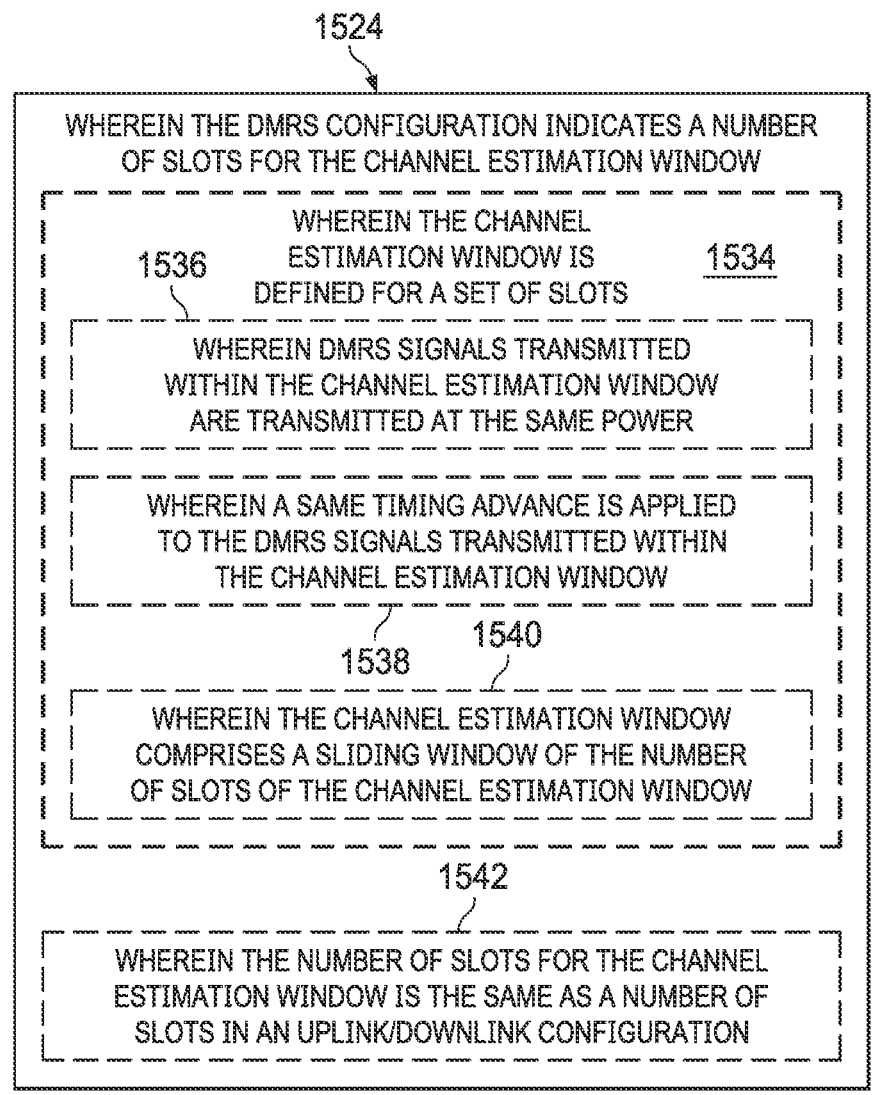
FIG. 15C is a flow diagram illustrating various options for where the DMRS configuration indicates a number of slots for the channel estimation bundle window 1524, in accordance with aspects of the present disclosure.

FIG. 15C is a flow diagram illustrating various options for where the DMRS configuration indicates a number of slots for the channel estimation bundle window 1524, in accordance with aspects of the present disclosure. In certain cases, the number of slots may be indicated by specifying specific slots, a mapping, and/or a number of slots. At block 1534, an option is presented for where the channel estimation bundle window is defined for a set of slots. At block 1536, an option is presented for where the DMRS signals transmitted within the channel estimation bundle window are transmitted at the same power. At block 1538, an option is presented for where a same timing advance is applied to the DMRS signals transmitted within the channel estimation bundle window. At block 1540, an option is presented for where the channel estimation bundle window comprises a sliding window of the number of slots of the channel estimation bundle window. At block 1542, an option is presented for where the number of slots for the channel estimation bundle window is the same as a number of slots in an uplink/downlink configuration.

Figure 15D:
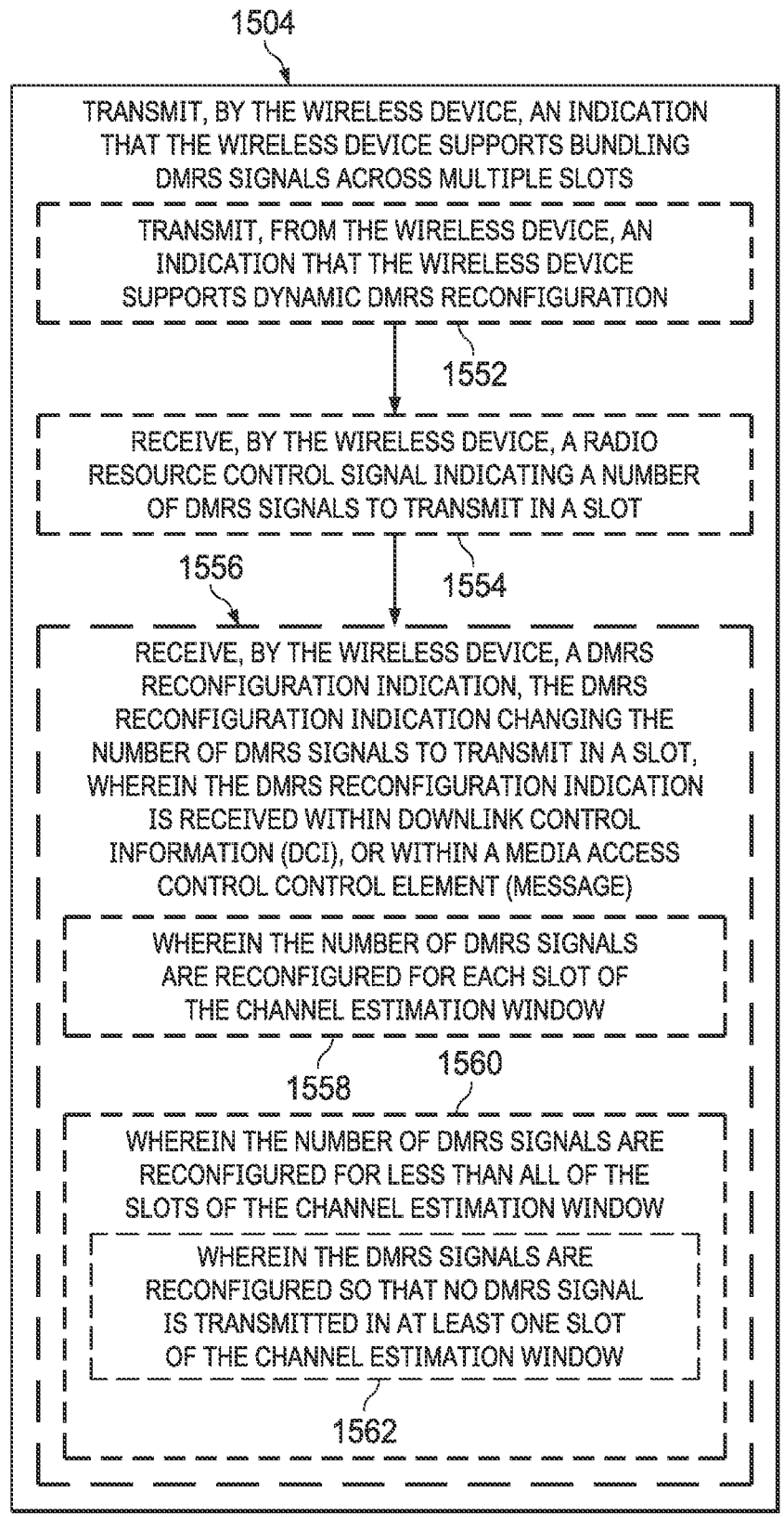
FIG. 15D is a flow diagram illustrating various ways to transmit an indication that the wireless device supports bundling DMRS signals across multiple slots 1504, in accordance with aspects of the present disclosure.

FIG. 15D is a flow diagram illustrating various ways to transmit an indication that the wireless device supports bundling DMRS signals across multiple slots 1504, in accordance with aspects of the present disclosure. At block 1552, the wireless device transmits an indication that the wireless device supports dynamic DMRS reconfiguration. For example, this indication may be separate from the indication that the wireless device supports bundling DMRS, or may be combined with the indication that the wireless device supports bundling DMRS. In certain cases, an indication that wireless device supports bundling DMRS may indicate that the wireless device supports dynamic DMRS reconfiguration. At block 1554, the wireless device receives a RRC signal indicating a number of DMRS signals to transmit in a slot. At block 1556, the wireless device receives a DMRS reconfiguration indication, the DMRS reconfiguration indication changing the number of DMRS signals to transmit in a slot, wherein the DMRS reconfiguration indication is received within a DCI or MAC CE message. At block 1558, an option is presented for where the number of DMRS signals are reconfigured for each slot of the channel estimation bundle window. At block 1560, an option is presented for where the number of DMRS signals are reconfigured for less than all of the slots of the channel estimation bundle window. For example, the DMRS signals may be reconfigured based on a pattern of transmissions across the slots of the channel estimation bundle window. At block 1562, an option is presented for where the DMRS signals are reconfigured so that no DMRS signal is transmitted in at least one slot of the channel estimation bundle window.

Figure 16A:
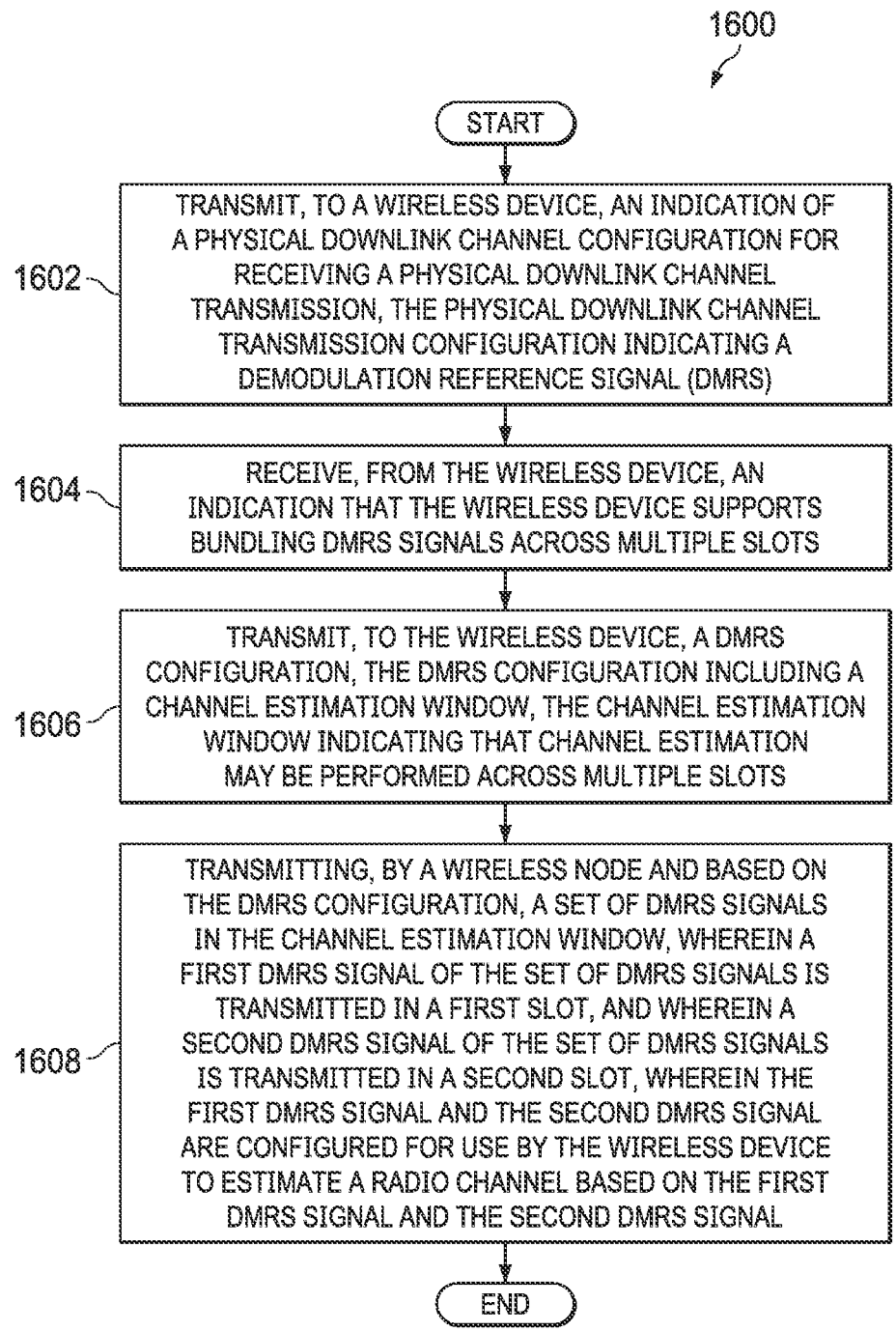
FIG. 16A is a flow diagram illustrating a technique for channel estimation in a wireless system, in accordance with aspects of the present disclosure.

FIG. 16A is a flow diagram illustrating a technique for channel estimation in a wireless system 1600, in accordance with aspects of the present disclosure. At block 1602, an indication of a physical downlink channel configuration for receiving a physical downlink channel transmission is transmitted to a wireless node, the physical downlink channel transmission including a demodulation reference signal (DMRS). For example, a wireless node may transmit a DL channel configuration message via RRC to configure the UE to receive a DL channel and DMRS transmitted with the DL channel, from the wireless node. At block 1604, an indication that the wireless device supports bundling DMRS signals across multiple slots is received from the wireless device. For example, the wireless node may receive from the UE an indication of support for cross slot channel estimation and/or dynamic DMRS configuration via a UE capability message. At block 1606, a DMRS configuration is transmitted to the wireless device, the DMRS configuration including a channel estimation bundle window, the channel estimation bundle window indicating that channel estimation may be performed across multiple slots. For example, the wireless node may transmit a DMRS configuration to the UE via a DCI or MAC CE message. At block 1608, a set of DMRS signals are transmitted, to a wireless node and based on the DMRS configuration, in the channel estimation bundle window, wherein a first DMRS signal of the set of DMRS signals is transmitted in a first slot, and wherein a second DMRS signal of the set of DMRS signals is transmitted in a second slot, and wherein the first DMRS signal and the second DMRS signal are configured for use by the wireless device to estimate a radio channel based on the first DMRS signal and the second DMRS signal. For example, the gNB may transmit signals in multiple slots via a DL channel to the UE, the signals including DMRS signals in multiple slots. The DMRS signals may be configured to be used by the UE to estimate a radio channel and decode a transmission received from the gNB over the radio channel.

FIG. 16B is a flow diagram illustrating various ways to transmit, to the wireless device, a DMRS configuration of step 1606, in accordance with aspects of the present disclosure. At block 1652, an option is presented for where the DMRS configuration includes an indication that the DMRS signals may be estimated across different DMRS repetitions. At block 1654, an option is presented for where the DMRS configuration includes an indication that the DMRS signals may be estimated across different transport blocks. At block 1656, an option is presented for where the DMRS configuration is transmitted via one of radio resource control signaling, within a field in a DCI, or within a MAC CE. At block 1658, an option is presented for where a same PDSCH precoding is used within the channel estimation bundle window. At block 1660, an option is presented for where the physical downlink channel comprises one of a physical downlink shared channel or a physical downlink control channel.

FIG. 16C is a flow diagram illustrating various ways to transmit, by a wireless node and based on the DMRS configuration, a set of DMRS signals in the channel estimation bundle window of step 1608, in accordance with aspects of the present disclosure. At block 1662, an option is presented for where the first DMRS signal and the second DMRS signal are transmitted at a same power.

Figure 17A:
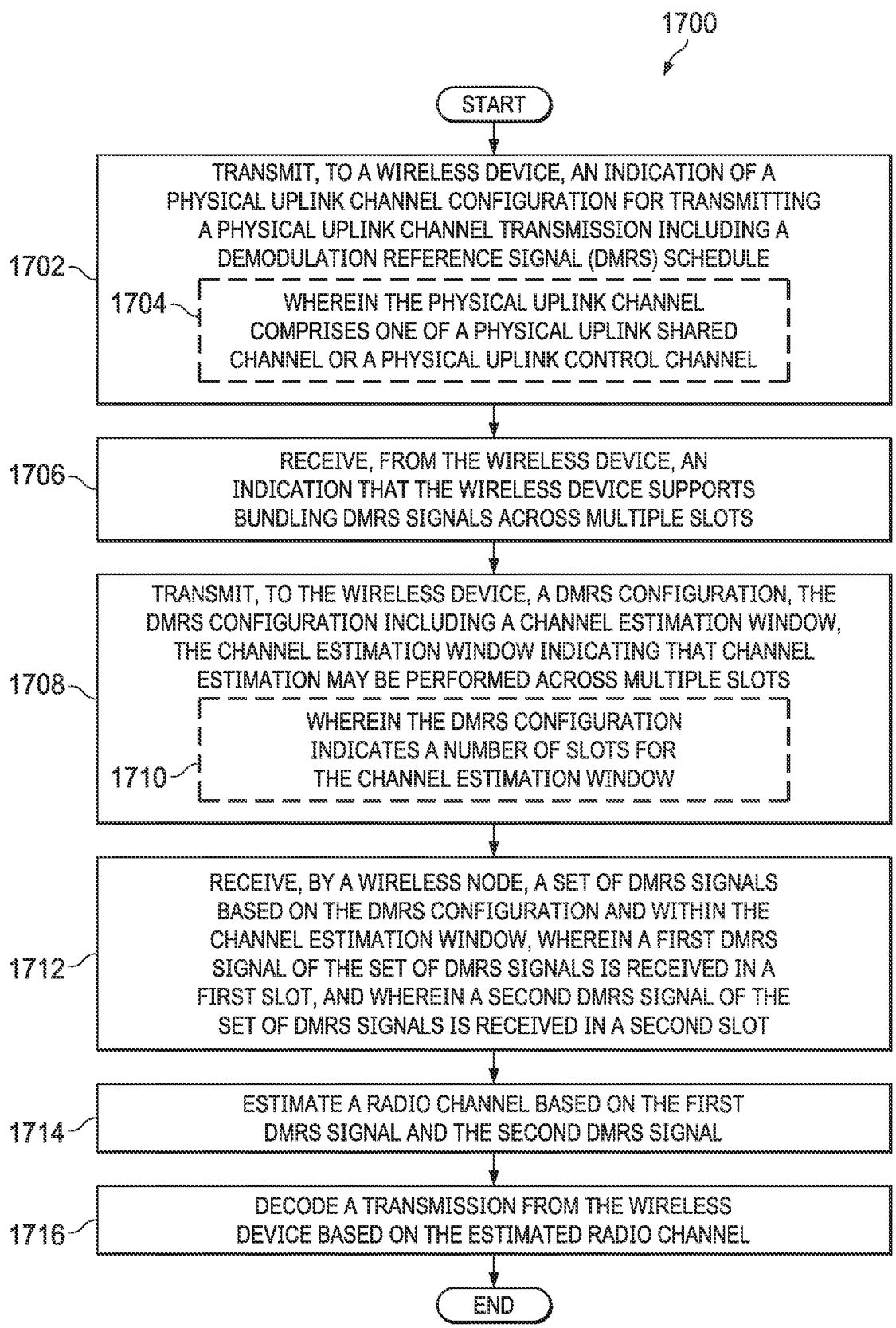
FIG. 17A is a flow diagram illustrating a technique for channel estimation in a wireless system, in accordance with aspects of the present disclosure.

FIG. 17A is a flow diagram illustrating a technique for channel estimation in a wireless system 1700, in accordance with aspects of the present disclosure. At block 1702, an indication of a physical uplink channel configuration for transmitting a physical uplink channel transmission including a DMRS schedule is transmitted to a wireless device. For example, a wireless node may transmit a UL channel configuration message via RRC to configure the UE to transmit a UL channel and DMRS transmitted with the UL channel. At block 1704, an option is presented for where the physical uplink channel comprises one of a physical uplink shared channel or a physical uplink control channel. At block 1706, an indication that the wireless device supports bundling DMRS signals across multiple slots is received from the wireless device. For example, the wireless node may receive from the UE an indication of support for cross slot channel estimation and/or dynamic DMRS configuration via a UE capability message. At block 1708, a DMRS configuration is transmitted to the wireless device, the DMRS configuration including a channel estimation bundle window, the channel estimation bundle window indicating that channel estimation may be performed across multiple slots. For example, the wireless node may transmit a DMRS configuration to the UE via a DCI or MAC CE message. At block 1710, an option is presented for where the DMRS configuration indicates a number of slots for the channel estimation bundle window. At block 1712, a set of DMRS signals based on the DMRS configuration and within the channel estimation bundle window are received by the wireless node, wherein a first DMRS signal of the set of DMRS signals is received in a first slot, and wherein a second DMRS signal of the set of DMRS signals is received in a second slot. For example, the gNB may receive signals in multiple slots via the UL channel from the UE, the signals including DMRS signals in multiple slots. The DMRS signals may be configured to be used by the gNB to estimate a radio channel and decode a transmission received from the UE over the radio channel. At block 1714, a radio channel is estimated based on the first DMRS signal and the second DMRS signal. For example, the radio channel may be estimated across multiple slots. At block 1716, a transmission from the wireless device is decoded based on the estimated radio channel.

Figure 17B:
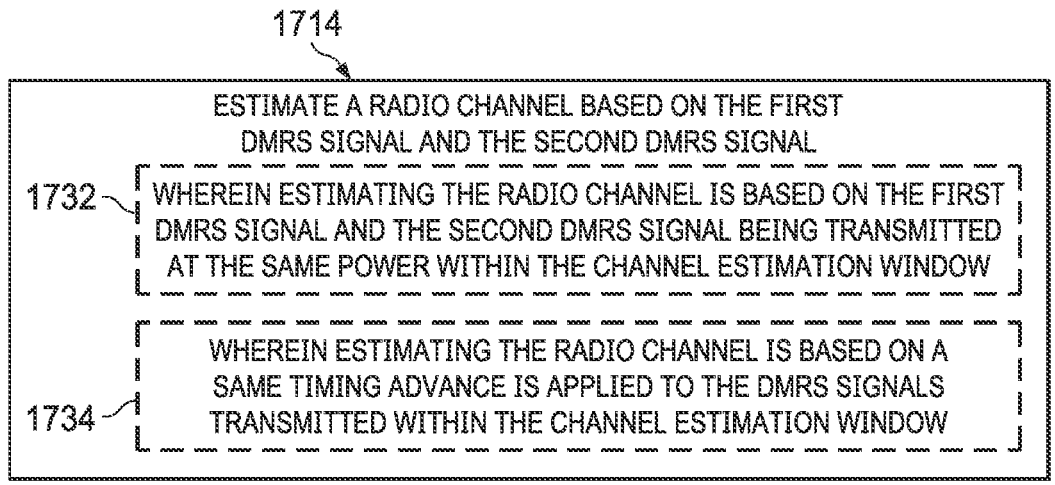
FIG. 17B is a flow diagram for estimating a radio channel based on the first DMRS signal and the second DMRS signal of block 1714, in accordance with aspects of the present disclosure.

FIG. 17B is a flow diagram for estimating a radio channel based on the first DMRS signal and the second DMRS signal of block 1714, in accordance with aspects of the present disclosure. At block 1732, an option is presented for where the radio channel is estimated based on the first DMRS signal and the second DMRS signal being transmitted at the same power within the channel estimation bundle window. At block 1734, an option is presented for where the radio channel is estimated based on the first DMRS signal and the second DMRS signal being transmitted with a same timing advance within the channel estimation bundle window.

Figure 17C:
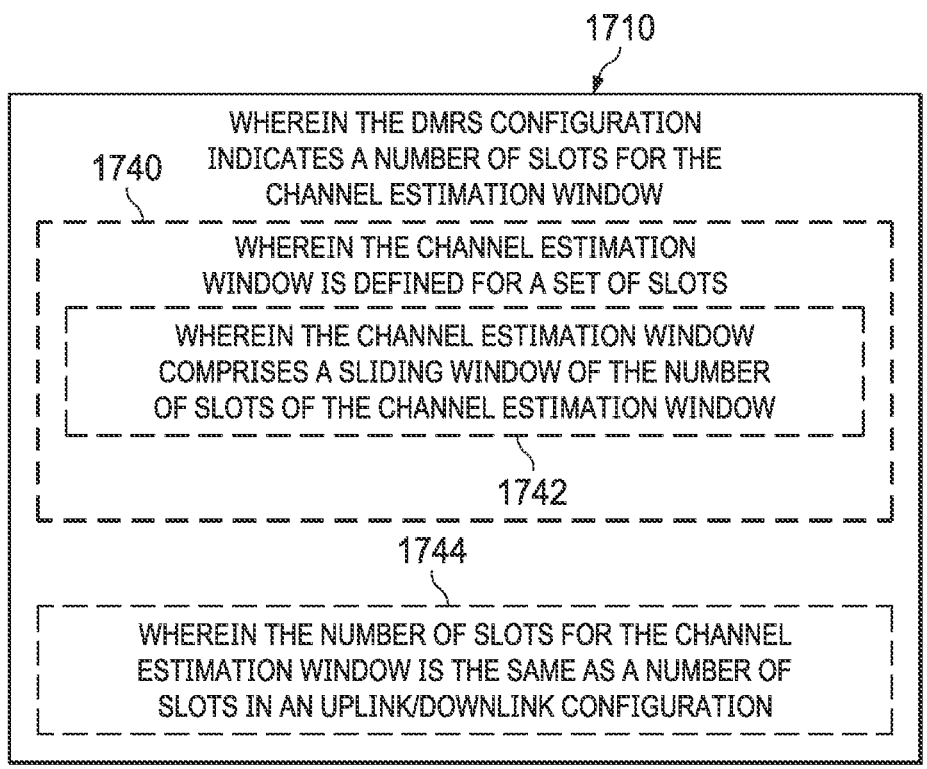
FIG. 17C is a flow diagram illustrating options for where the DMRS configuration indicates a number of slots for the channel estimation bundle window of block 1710, in accordance with aspects of the present disclosure.

FIG. 17C is a flow diagram illustrating options for where the DMRS configuration indicates a number of slots for the channel estimation bundle window of block 1710, in accordance with aspects of the present disclosure. At block 1740, an option is presented for where the channel estimation bundle window is defined for a set of slots. At block 1742, an option is presented for where the channel estimation bundle window comprises a sliding window of the number of slots of the channel estimation bundle window. At block 1744, an option is presented for where wherein the number of slots for the channel estimation bundle window is the same as a number of slots in an uplink/downlink configuration.

Figure 17D:
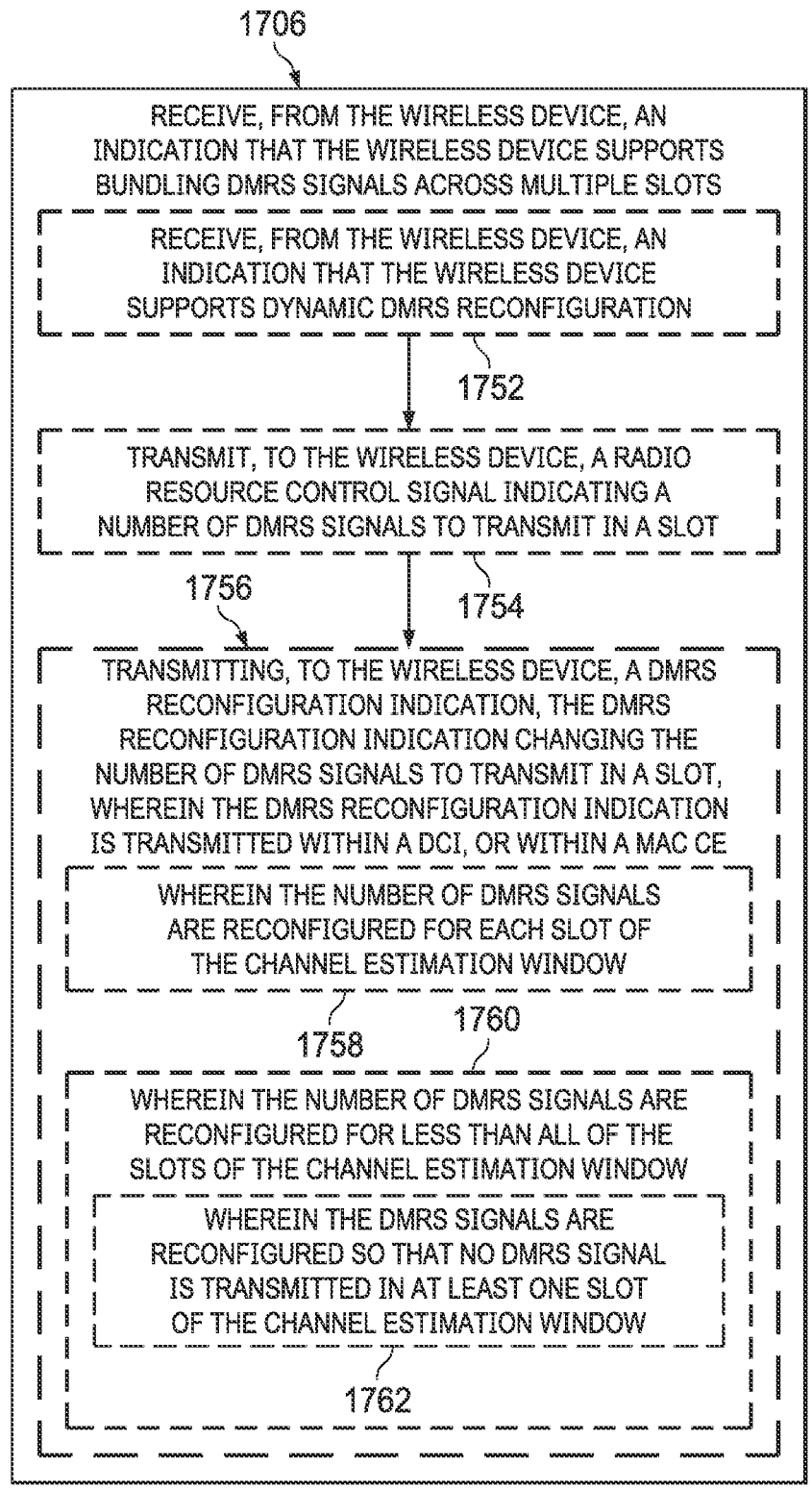
FIG. 17D is a flow diagram illustrating various ways to receiving an indication that the wireless device supports bundling DMRS signals across multiple slots of block 1706, in accordance with aspects of the present disclosure.

FIG. 17D is a flow diagram illustrating various ways to receiving an indication that the wireless device supports bundling DMRS signals across multiple slots of block 1706, in accordance with aspects of the present disclosure. At block 1752, an indication that the wireless device supports dynamic DMRS reconfiguration is received from the wireless device. For example, this indication may be separate from the indication that the wireless device supports bundling DMRS, or may be combined with the indication that the wireless device supports bundling DMRS. In certain cases, an indication that wireless device supports bundling DMRS may indicate that the wireless device supports dynamic DMRS reconfiguration. At block 1754, a radio resource control signal indicating a number of DMRS signals to transmit in a slot is transmitted to the wireless device. For example, DMRS signaling may be configured based on a RRC message. At block 1756, a DMRS reconfiguration indication, the DMRS reconfiguration indication changing the number of DMRS signals to transmit in a slot is transmitted to the wireless device, wherein the DMRS reconfiguration indication is transmitted within a DCI, or within a MAC CE. At block 1758, an option is presented for where the number of DMRS signals are adjusted for each slot of the channel estimation bundle window. At block 1760, an option is presented for where the number of DMRS signals are adjusted for less than all of the slots of the channel estimation bundle window. For example, the DMRS signals may be reconfigured based on a pattern of transmissions across the slots of the channel estimation bundle window. At block 1762 an option is presented for where the DMRS signals are reconfigured so that no DMRS signal is transmitted in at least one slot of the channel estimation bundle window.

EXAMPLES

In the following sections, further exemplary aspects are provided.

According to Example 1, a method for channel estimation in a wireless system, comprising: receiving, by a wireless device, an indication of a physical downlink channel configuration for receiving a physical downlink channel transmission, the physical downlink channel transmission including a demodulation reference signal (DMRS); transmitting, by the wireless device, an indication that the wireless device supports bundling DMRS signals across multiple slots; receiving, by the wireless device, a DMRS configuration, the DMRS configuration including a channel estimation bundle window, the channel estimation bundle window indicating that channel estimation may be performed across multiple slots; receiving, based on the DMRS configuration, a set of DMRS signals within the channel estimation bundle window, wherein a first DMRS signal of the set of DMRS signals is received in a first slot, and wherein a second DMRS signal of the set of DMRS signals is received in a second slot; estimating a radio channel based on the first DMRS signal and the second DMRS signal; and decoding a transmission from a wireless node based on the estimated radio channel.

Example 2 comprises the subject matter of example 1, wherein the physical downlink channel comprises one of a physical downlink shared channel (PDSCH) or a physical downlink control channel (PDCCH).

Example 3 comprises the subject matter of example 2, wherein a same PDSCH precoding is used within the channel estimation bundle window.

Example 4 comprises the subject matter of example 1, wherein the DMRS configuration includes an indication that the DMRS signals may be estimated across different transport blocks.

Example 5 comprises the subject matter of example 1, wherein the DMRS configuration includes an indication that the DMRS signals may be estimated across different DMRS repetitions.

Example 6 comprises the subject matter of example 1, wherein the DMRS configuration is received via one of radio resource control signaling, within a field in downlink control information (DCI), or within a media access control control element (MAC CE).

According to Example 7, a method for channel estimation in a wireless system, comprising: receiving, by a wireless device, an indication of a physical uplink channel configuration, the physical uplink channel configuration for transmitting a physical uplink channel transmission including a demodulation reference signal (DMRS); transmitting, by the wireless device, an indication that the wireless device supports bundling DMRS signals across multiple slots; receiving, by the wireless device, a DMRS configuration, the DMRS configuration including a channel estimation bundle window, the channel estimation bundle window indicating that channel estimation may be performed across multiple slots; and transmitting, based on the DMRS configuration, a set of DMRS signals to a wireless node within the channel estimation bundle window, wherein a first DMRS signal of the set of DMRS signals is transmitted in a first slot, and wherein a second DMRS signal of the set of DMRS signals is transmitted in a second slot, wherein the first DMRS signal and the second DMRS signal are configured for use by the wireless node to estimate a radio channel.

Example 8 comprises the subject matter of example 7, wherein the first DMRS signal and the second DMRS signal are transmitted at a same power.

Example 9 comprises the subject matter of example 7, wherein the physical uplink channel comprises one of a physical uplink shared channel or a physical uplink control channel.

Example 10 comprises the subject matter of example 7, wherein the DMRS configuration indicates a number of slots for the channel estimation bundle window.

Example 11 comprises the subject matter of example 10, wherein the channel estimation bundle window is defined for a set of slots.

Example 12 comprises the subject matter of example 11, wherein the DMRS signals transmitted within the channel estimation bundle window are transmitted at the same power.

Example 13 comprises the subject matter of example 11, wherein a same timing advance is applied to the DMRS signals transmitted within the channel estimation bundle window.

Example 14 comprises the subject matter of example 10, wherein the channel estimation bundle window comprises a sliding window of the number of slots of the channel estimation bundle window.

Example 15 comprises the subject matter of example 10, wherein the number of slots for the channel estimation bundle window is the same as a number of slots in an uplink/downlink configuration.

Example 16 comprises the subject matter of example 7, further comprising: transmitting, from the wireless device, an indication that the wireless device supports dynamic DMRS reconfiguration; receiving, by the wireless device, a radio resource control signal indicating a number of DMRS signals to transmit in a slot; receiving, by the wireless device, a DMRS reconfiguration indication, the DMRS reconfiguration indication changing the number of DMRS signals to transmit in a slot, wherein the DMRS reconfiguration indication is received within downlink control information (DCI), or within a media access control control element (MAC CE) message.

Example 17 comprises the subject matter of example 16, wherein the number of DMRS signals are reconfigured for each slot of the channel estimation bundle window.

Example 18 comprises the subject matter of example 16, wherein the number of DMRS signals are reconfigured for less than all of the slots of the channel estimation bundle window.

Example 19 comprises the subject matter of example 18, wherein the DMRS signals are reconfigured so that no DMRS signal is transmitted in at least one slot of the channel estimation bundle window.

Example 20 comprises the subject matter of example 19, wherein the DMRS signals are reconfigured such that the DMRS signal is transmitted in slots that are transmitted earlier in time than the at least one slot where no DMRS signal is transmitted.

Example 21 comprises the subject matter of example 16, wherein a DMRS port is changed for each channel estimation bundle window.

Example 22 comprises the subject matter of example 16, further comprising transmitting, by the wireless device, an indication that the wireless device supports DMRS reconfiguration.

According to example 23, a method for channel estimation in a wireless system, comprising: transmitting, to a wireless device, an indication of a physical downlink channel configuration for receiving a physical downlink channel transmission, the physical downlink channel transmission including a demodulation reference signal (DMRS); receiving, from the wireless device, an indication that the wireless device supports bundling DMRS signals across multiple slots; transmitting, to the wireless device, a DMRS configuration, the DMRS configuration including a channel estimation bundle window, the channel estimation bundle window indicating that channel estimation may be performed across multiple slots; transmitting, by a wireless node and based on the DMRS configuration, a set of DMRS signals in the channel estimation bundle window, wherein a first DMRS signal of the set of DMRS signals is transmitted in a first slot, and wherein a second DMRS signal of the set of DMRS signals is transmitted in a second slot, and wherein the first DMRS signal and the second DMRS signal are configured for use by the wireless device to estimate a radio channel based on the first DMRS signal and the second DMRS signal.

Example 24 comprises the subject matter of example 23, wherein the physical downlink channel comprises one of a physical downlink shared channel (PDSCH) or a physical downlink control channel (PDCCH).

Example 25 comprises the subject matter of example 24, wherein a same PDSCH precoding is used within the channel estimation bundle window.

Example 26 comprises the subject matter of example 23, wherein the DMRS configuration includes an indication that the DMRS signals may be estimated across different transport blocks.

Example 27 comprises the subject matter of example 23, wherein the DMRS configuration includes an indication that the DMRS signals may be estimated across different DMRS repetitions.

Example 28 comprises the subject matter of example 23, wherein the DMRS configuration is transmitted via one of radio resource control signaling, within a field in a downlink control information (DCI), or within a media access control control element (MAC CE).

Example 29 comprises the subject matter of example 23, wherein the first DMRS signal and the second DMRS signal are transmitted at a same power.

According to example 30, a method for channel estimation in a wireless system, comprising: transmitting, to a wireless device, an indication of a physical uplink channel configuration for transmitting a physical uplink channel transmission including a demodulation reference signal (DMRS) schedule; receiving, from the wireless device, an indication that the wireless device supports bundling DMRS signals across multiple slots; transmitting, to the wireless device, a DMRS configuration, the DMRS configuration including a channel estimation bundle, the channel estimation bundle window indicating that channel estimation may be performed across multiple slots; receiving, by a wireless node, a set of DMRS signals based on the DMRS configuration and within the channel estimation bundle window, wherein a first DMRS signal of the set of DMRS signals is received in a first slot, and wherein a second DMRS signal of the set of DMRS signals is received in a second slot, estimating a radio channel based on the first DMRS signal and the second DMRS signal; and decoding a transmission from the wireless device based on the estimated radio channel.

Example 31 comprises the subject matter of example 30, wherein the physical uplink channel comprises one of a physical uplink shared channel or a physical uplink control channel.

Example 32 comprises the subject matter of example 30, wherein the radio channel is estimated based on the first DMRS signal and the second DMRS signal being transmitted at the same power within the channel estimation bundle window.

Example 33 comprises the subject matter of example 30, wherein the radio channel is estimated based on the first DMRS signal and the second DMRS signal being transmitted with a same timing advance within the channel estimation bundle window, channel estimation bundle window Example 34 comprises the subject matter of example 30, wherein the DMRS configuration indicates a number of slots for the channel estimation bundle window.

Example 35 comprises the subject matter of example 32, wherein the channel estimation bundle window is defined for a set of slots.

Example 36 comprises the subject matter of example 32, wherein the channel estimation bundle window comprises a sliding window of the number of slots of the channel estimation bundle window.

Example 37 comprises the subject matter of example 32, wherein the number of slots for the channel estimation bundle window is the same as a number of slots in an uplink/downlink configuration.

Example 38 comprises the subject matter of example 30, further comprising: receiving from the wireless device, an indication that the wireless device supports dynamic DMRS reconfiguration; transmitting, to the wireless device, a radio resource control signal indicating a number of DMRS signals to transmit in a slot; transmitting, to the wireless device, a DMRS reconfiguration indication, the DMRS reconfiguration indication changing the number of DMRS signals to transmit in a slot, wherein the DMRS reconfiguration indication is transmitted within a downlink control information (DCI), or within a media access control control element (MAC CE).

Example 39 comprises the subject matter of example 38, wherein the number of DMRS signals are adjusted for each slot of the channel estimation bundle window.

Example 40 comprises the subject matter of example 38, wherein the number of DMRS signals are adjusted for less than all of the slots of the channel estimation bundle window.

Example 41 comprises the subject matter of example 40, wherein the DMRS signals are reconfigured such that no DMRS signal is transmitted in at least one slot of the channel estimation bundle window.

Example 42 comprises the subject matter of example 41, wherein the DMRS signals are reconfigured such that the DMRS signal is transmitted in slots that are transmitted earlier in time than the at least one slot where no DMRS signal is transmitted.

Example 43 comprises the subject matter of example 38, wherein a DMRS port is changed for each channel estimation bundle window.

Example 44 comprises the subject matter of example 38, further comprising receiving, from the wireless device, an indication that the wireless device supports DMRS reconfiguration.

Example 45 comprises a method that includes any action or combination of actions as substantially described herein in the Detailed Description.

Example 46 comprises a method as substantially described herein with reference to each or any combination of the Figures included herein or with reference to each or any combination of paragraphs in the Detailed Description.

Example 47 comprises a wireless device configured to perform any action or combination of actions as substantially described herein in the Detailed Description as included in the wireless device.

Example 48 comprises a wireless station configured to perform any action or combination of actions as substantially described herein in the Detailed Description as included in the wireless station.

Example 49 comprises a non-volatile computer-readable medium that stores instructions that, when executed, cause the performance of any action or combination of actions as substantially described herein in the Detailed Description.

Example 50 comprises an integrated circuit configured to perform any action or combination of actions as substantially described herein in the Detailed Description.

Yet another exemplary aspect may include a method, comprising, by a device, performing any or all parts of the preceding Examples.

A yet further exemplary aspect may include a non-transitory computer-accessible memory medium comprising program instructions which, when executed at a device, cause the device to implement any or all parts of any of the preceding Examples.

A still further exemplary aspect may include a computer program comprising instructions for performing any or all parts of any of the preceding Examples.

Yet another exemplary aspect may include an apparatus comprising means for performing any or all of the elements of any of the preceding Examples.

Still another exemplary aspect may include an apparatus comprising a processor configured to cause a device to perform any or all of the elements of any of the preceding Examples.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Aspects of the present disclosure may be realized in any of various forms. For example, some aspects may be realized as a computer-implemented method, a computer-readable memory medium, or a computer system. Other aspects may be realized using one or more custom-designed hardware devices such as ASICs. Still other aspects may be realized using one or more programmable hardware elements such as FPGAs.

In some aspects, a non-transitory computer-readable memory medium may be configured so that it stores program instructions and/or data, where the program instructions, if executed by a computer system, cause the computer system to perform a method, e.g., any of a method aspects described herein, or, any combination of the method aspects described herein, or, any subset of any of the method aspects described herein, or, any combination of such subsets.

In some aspects, a device (e.g., a UE 106, a BS 102, a network element 600) may be configured to include a processor (or a set of processors) and a memory medium, where the memory medium stores program instructions, where the processor is configured to read and execute the program instructions from the memory medium, where the program instructions are executable to implement any of the various method aspects described herein (or, any combination of the method aspects described herein, or, any subset of any of the method aspects described herein, or, any combination of such subsets). The device may be realized in any of various forms.

Although the aspects above have been described in considerable detail, numerous variations and modifications will become apparent to those skilled in the art once the above disclosure is fully appreciated. It is intended that the following claims be interpreted to embrace all such variations and modifications.

What is claimed is:

1. A method for channel estimation in a wireless system, comprising:
   transmitting, to a wireless device, an indication of a physical downlink channel configuration for receiving a physical downlink channel transmission, the physical downlink channel transmission including a demodulation reference signal (DMRS);
   receiving, from the wireless device, an indication that the wireless device supports bundling DMRS signals across multiple slots and an indication that the wireless device supports dynamic DMRS reconfiguration;
   transmitting, to the wireless device, a DMRS configuration, wherein the DMRS configuration includes a channel estimation bundle window indicating that channel estimation may be performed across multiple slots, and wherein the DMRS configuration further indicates a number of DMRS signals to transmit in at least one of the multiple slots of the channel estimation bundle window;
   transmitting, by a wireless node and based on the DMRS configuration, a set of DMRS signals in the channel estimation bundle window, wherein a first DMRS signal of the set of DMRS signals is transmitted in a first slot, and wherein a second DMRS signal of the set of DMRS signals is transmitted in a second slot, and wherein the first DMRS signal and the second DMRS signal are configured for use by the wireless device to estimate a radio channel based on the first DMRS signal and the second DMRS signal, and
   transmit a DMRS reconfiguration indication, the DMRS reconfiguration indication changing the number of DMRS signals to transmit in at least one of the multiple slots of the channel estimation bundle window.

2. The method of claim 1, wherein the physical downlink channel comprises one of a physical downlink shared channel (PDSCH) or a physical downlink control channel (PDCCH).

3. The method of claim 2, wherein a same PDSCH precoding is used within the channel estimation bundle window.

4. The method of claim 1, wherein the DMRS configuration includes an indication that the DMRS signals may be estimated across different transport blocks.

5. The method of claim 1, wherein the DMRS configuration includes an indication that the DMRS signals may be estimated across different DMRS repetitions.

6. The method of claim 1, wherein the DMRS configuration is transmitted via one of radio resource control signaling, within a field in a downlink control information (DCI), or within a media access control (MAC) control element (MAC CE).

7. The method of claim 1, wherein the first DMRS signal and the second DMRS signal are transmitted at a same power.

8. A wireless node, comprising:
   a radio; and
   a processor operably coupled to the radio;
   wherein the processor is configured to, when executing instructions stored in memory, cause the wireless node to:
      transmit, to a wireless device, an indication of a physical uplink channel configuration for transmitting a physical uplink channel transmission including a demodulation reference signal (DMRS) schedule;
      receive, from the wireless device, an indication that the wireless device supports bundling DMRS signals across multiple slots and an indication that the wireless device supports dynamic DMRS reconfiguration;
      transmit, to the wireless device, a DMRS configuration, wherein the DMRS configuration includes a channel estimation bundle window indicating that channel estimation may be performed across multiple slots, and wherein the DMRS configuration further indicates a number of DMRS signals to transmit in at least one of the multiple slots of the channel estimation bundle window;

receive a set of DMRS signals based on the DMRS configuration and within the channel estimation bundle window, wherein a first DMRS signal of the set of DMRS signals is received in a first slot, and wherein a second DMRS signal of the set of DMRS signals is received in a second slot;

estimate a radio channel based on the first DMRS signal and the second DMRS signal;

decode a transmission from the wireless device based on the estimated radio channel; and transmit, to the wireless device, a DMRS reconfiguration indication, the DMRS reconfiguration indication changing the number of DMRS signals to transmit in at least one of the multiple slots of the channel estimation bundle window.

9. The wireless node of claim 8, wherein the physical uplink channel comprises one of a physical uplink shared channel or a physical uplink control channel.

10. The wireless node of claim 8, wherein the radio channel is estimated based on the first DMRS signal and the second DMRS signal being transmitted at the same power within the channel estimation bundle window.

11. The wireless node of claim 10, wherein the channel estimation bundle window is defined for a set of slots.

12. The wireless node of claim 10, wherein the channel estimation bundle window comprises a sliding window of the number of slots of the channel estimation bundle window.

13. The wireless node of claim 10, wherein the number of slots for the channel estimation bundle window is the same as a number of slots in an uplink/downlink configuration.

14. The wireless node of claim 8, wherein the DMRS configuration indicates a number of slots for the channel estimation bundle window.

15. The wireless node of claim 8,
wherein the DMRS reconfiguration indication is transmitted within a downlink control information (DCI), or within a media access control control element (MAC CE).

16. The wireless node of claim 8, wherein the number of DMRS signals are adjusted for each slot of the channel estimation bundle window.

17. The wireless node of claim 8, wherein the number of DMRS signals are adjusted for less than all of the slots of the channel estimation bundle window.

18. The wireless node of claim 17, wherein the DMRS signals are reconfigured such that:
no DMRS signal is transmitted in at least one slot of the channel estimation bundle window; and
the DMRS signal is transmitted in slots that are transmitted earlier in time than the at least one slot where no DMRS signal is transmitted.

19. The wireless node of claim 8, wherein a DMRS port is changed for each channel estimation bundle window.

20. An integrated circuit, comprising circuitry configured to cause a wireless node to:
transmit, to a wireless device, an indication of a physical downlink channel configuration for receiving a physical downlink channel transmission, the physical downlink channel transmission including a demodulation reference signal (DMRS);

receive, from the wireless device, an indication that the wireless device supports bundling DMRS signals across multiple slots and an indication that the wireless device supports dynamic DMRS reconfiguration;

transmit, to the wireless device, a DMRS configuration, wherein the DMRS configuration includes a channel estimation bundle window indicating that channel estimation may be performed across multiple slots, and wherein the DMRS configuration further indicates a number of DMRS signals to transmit in at least one of the multiple slots of the channel estimation bundle window;

transmit, based on the DMRS configuration, a set of DMRS signals in the channel estimation bundle window, wherein a first DMRS signal of the set of DMRS signals is transmitted in a first slot, and wherein a second DMRS signal of the set of DMRS signals is transmitted in a second slot, and wherein the first DMRS signal and the second DMRS signal are configured for use by the wireless device to estimate a radio channel based on the first DMRS signal and the second DMRS signal, and transmit a DMRS reconfiguration indication, the DMRS reconfiguration indication changing the number of DMRS signals to transmit in at least one of the multiple slots of the channel estimation bundle window.

\* \* \* \* \*